(12) United States Patent
Zhang

(10) Patent No.: US 11,950,272 B2
(45) Date of Patent: Apr. 2, 2024

(54) METHOD AND DEVICE IN WIRELESS TRANSMISSION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 434 days.

(21) Appl. No.: 17/235,964

(22) Filed: Apr. 21, 2021

(65) Prior Publication Data

US 2021/0258972 A1 Aug. 19, 2021

Related U.S. Application Data

(63) Continuation of application No. 16/255,830, filed on Jan. 24, 2019, now Pat. No. 11,019,634, which is a
(Continued)

(30) Foreign Application Priority Data

Jul. 25, 2016 (CN) .......................... 201610590751.2

(51) Int. Cl.
*H04B 7/06* (2006.01)
*H04B 7/0404* (2017.01)
(Continued)

(52) U.S. Cl.
CPC ........ *H04W 72/542* (2023.01); *H04B 7/0404* (2013.01); *H04B 7/0417* (2013.01);
(Continued)

(58) Field of Classification Search
CPC . H04W 72/542; H04B 7/0404; H04B 7/0417; H04B 7/0617; H04B 7/0626;
(Continued)

(56) References Cited

U.S. PATENT DOCUMENTS 10,624,156 B2 * 4/2020 Xiong ................... H04L 1/1861
2009/0305698 A1 * 12/2009 Zhang ................... H04L 5/0053
455/434
(Continued)

FOREIGN PATENT DOCUMENTS

CN 1731701 A 2/2006
CN 103179664 A 6/2013
(Continued)

OTHER PUBLICATIONS

CN201610590751.2 Notification to Grant Patent Right for Invention dated Nov. 27, 2020.
(Continued)

*Primary Examiner* — Charles C Jiang
*Assistant Examiner* — Shawn D Miller

(57) ABSTRACT

The present disclosure provides a method and a device in wireless transmission. A User Equipment (UE) first receives a first signaling, and then receives a first radio signal, the first radio signal carrying a first bit block. The first signaling is used for determining a transmission format corresponding to the first radio signal. The transmission format corresponding to the first radio signal is one transmission format in a first format set, and the first format set comprises a first transmission format and a second transmission format. A radio signal corresponding to the first transmission format includes P radio sub-signal(s), each one of the P radio sub-signal(s) carries the first bit block, and the P radio sub-signal(s) is(are) transmitted by a same antenna port group.

20 Claims, 9 Drawing Sheets

Related U.S. Application Data continuation of application No. PCT/CN2017/092479, filed on Jul. 11, 2017.

(51) Int. Cl.
*H04B 7/0417* (2017.01)
*H04J 3/16* (2006.01)
*H04L 5/00* (2006.01)
*H04W 72/542* (2023.01)

(52) U.S. Cl.
CPC ......... *H04B 7/0617* (2013.01); *H04B 7/0626* (2013.01); *H04B 7/0689* (2013.01); *H04J 3/1694* (2013.01); *H04L 5/0053* (2013.01); *H04L 5/0023* (2013.01); *H04L 5/0057* (2013.01)

(58) Field of Classification Search
CPC .... H04B 7/0689; H04J 3/1694; H04L 5/0053; H04L 5/0023; H04L 5/0057; H04L 1/0693
See application file for complete search history.

(56) References Cited

U.S. PATENT DOCUMENTS

| | | | |
|---|---|---|---|
| 2011/0090825 A1* | 4/2011 | Papasakellariou | H04L 1/1861 370/328 |
| 2015/0334683 A1 | 11/2015 | Guo et al. | |

FOREIGN PATENT DOCUMENTS

| | | |
|---|---|---|
| CN | 103687042 A | 3/2014 |
| CN | 103795513 A | 5/2014 |
| CN | 104303477 A | 1/2015 |
| CN | 105634707 A | 6/2016 |
| CN | 105790806 A | 7/2016 |
| WO | 2014109622 A1 | 7/2014 |
| WO | 2015090828 A1 | 6/2015 |

OTHER PUBLICATIONS

CN201610590751.2 1st Office Action dated Sep. 3, 2020.
CN201610590751.2 First Search Report dated Aug. 30, 2020.
ISR received in application No. PCT/CN2017/092479 dated Aug. 30, 2017.

* cited by examiner

METHOD AND DEVICE IN WIRELESS TRANSMISSION

CROSS REFERENCE TO RELATED APPLICATION

This application is a continuation of U.S. patent Ser. No. 16/255,830, filed Jan. 24, 2019, which is a continuation-in-part of International Application No. PCT/CN2017/092479, filed Jul. 11, 2017, claiming the priority benefit of Chinese Patent Application Serial Number 201610590751.2, filed on Jul. 25, 2016, the full disclosure of which is incorporated herein by reference.

BACKGROUND

Technical Field

The present disclosure relates to methods and devices for multi-antenna transmission in the technical field of mobile communications, and in particular to a wireless communication scheme in scenarios that a base station side is deployed with a large number of antennas.

Related Art

Massive Multi-Input Multi-Output (MIMO) becomes one research hotspot of next-generation mobile communications. In the massive MIMO, multiple antennas experience beamforming to form a relatively narrow beam which points to a particular direction to improve the quality of communication. Generally, the beam formed by multiple antennas through beamforming is relatively narrow, and both sides of communication need to acquire partial channel information of each other in order to make the formed beam point to a correct direction. Before the both sides of communication acquire partial channel information of each other, or in the case that the partial channel information acquired previously has failed, reliable wireless transmission becomes a problem.

In view of the above problems, the present disclosure provides a solution. It should be noted that embodiments in the UE of the present disclosure and the characteristics in the embodiments may be applied to the base station if no conflict is incurred, and vice versa. Further, the embodiments of the present disclosure and the characteristics in the embodiments may be mutually combined if no conflict is incurred.

SUMMARY

The inventor finds through researches that when a base station does not acquire Channel Status Information (CSI) of a downlink channel targeting a User Equipment (UE), or the previously acquired downlink channel CSI has failed, the base station needs to ensure a correct reception of transmitted signals using greater redundancy, for example, a beam sweeping scheme, that is, the base station transmits the same signal multiple times through a Timing Division Multiplexing (TDM) mode, and each time of transmission is specific to a beam in a different direction. When a base station acquires a (partial) CSI of a downlink channel targeting a certain UE, the base station may employ a beamforming approach to reduce redundancy, improve transmission efficiency, and meanwhile guarantee the quality of reception of transmitted signals.

According to the above analysis, the present disclosure provides a method in a UE in wireless transmission, wherein the method includes:

receiving a first signaling; and receiving a first radio signal, the first radio signal carrying a first bit block.

Herein, the first signaling is a physical layer signaling, the first signaling is used for determining a transmission format corresponding to the first radio signal, and the first bit block includes a positive integer number of bits. The transmission format corresponding to the first radio signal is one transmission format in a first format set, and the first format set includes a first transmission format and a second transmission format. A radio signal corresponding to the first transmission format includes P radio sub-signal(s), each of the P radio sub-signal(s) carries the first bit block, each of the P radio sub-signal(s) is transmitted by a same antenna port group, and the P is a positive integer. A radio signal corresponding to the second transmission format includes Q radio sub-signals, each of the Q radio sub-signals carries the first bit block, the Q radio sub-signals are transmitted by Q antenna port groups respectively, any two of the Q antenna port groups cannot be assumed to be same, and the Q is an integer greater than 1. The antenna port group includes one or more antenna ports.

In one embodiment, time domain resources occupied by any two of the Q radio sub-signals are orthogonal.

In one embodiment, the phrase that a given radio signal carrying a given bit block refers that: the given radio signal is an output after the given bit block experiences in sequence channel coding, modulation mapper, layer mapper, precoding, resource element mapper, and generation of OFDM signals.

In one embodiment, the phrase that a given radio signal carrying a given bit block refers that: the given bit block is used for generating the given radio signal.

In one embodiment, the P is greater than 1, and time domain resources occupied by any two of the P radio sub-signals are orthogonal.

In one embodiment, the P is equal to 1.

In one embodiment, the first bit block is a Transport Block (TB).

In one embodiment, the first bit block includes two TBs.

In one embodiment, the radio sub-signal includes a reference signal.

In one embodiment, the first signaling indicates from the first format set the transmission format corresponding to the first radio signal.

In one embodiment, a payload size of the first signaling is different for the first transmission format and the second transmission format. In one embodiment, the UE determines the transmission format corresponding to the first radio signal according to the payload size of the first signaling.

In one embodiment, a payload size of the first signaling is same for the first transmission format and the second transmission format, and the first signaling indicates explicitly the transmission format corresponding to the first radio signal. In one subembodiment, an information bit in the first signaling indicates if the transmission format corresponding to the first radio signal is the first transmission format or the second transmission format.

In one embodiment, the first signaling includes scheduling information of the first radio signal, and the scheduling information includes at least one of {occupied time-frequency resources, a Modulation and Coding Scheme (MCS), a Redundancy Version (RV), a HARQ Process Number}.

In one embodiment, a physical layer channel corresponding to the first radio signal includes a downlink physical layer data channel (that is, a downlink channel capable of carrying physical layer data). In one embodiment, the downlink physical layer data channel is a Physical Downlink Shared Channel (PDSCH). In one embodiment, the downlink physical layer data channel is a short PDSCH (sPDSCH).

In one embodiment, a transport channel corresponding to the first radio signal is a Downlink Shared Channel (DL-SCH).

In one embodiment, a physical layer channel corresponding to the first signaling includes a downlink physical layer control channel (that is, a downlink channel capable of carrying physical layer signalings only). In one embodiment, the downlink physical layer control channel is a Physical Downlink Control Channel (PDCCH). In one embodiment, the downlink physical layer control channel is a short PDCCH (sPDCCH).

In one embodiment, the first signaling is Downlink Control Information (DCI).

In one embodiment, the antenna port group includes one antenna port.

In one embodiment, the antenna port group includes more than one antenna port.

In one embodiment, at least two of the Q antenna port groups include different numbers of antenna ports.

In one embodiment, the Q antenna port groups include a same number of antenna ports.

In one embodiment, the first signaling is used for determining the number of antenna ports in the antenna port group.

In one embodiment, the phrase that any two of the Q antenna port groups cannot be assumed to be same refers that: small-scale characteristics of a radio channel over which a signal transmitted by a first antenna port is conveyed cannot be used to deduce small-scale characteristics of a radio channel over which a signal transmitted by a second antenna port is conveyed. The first antenna port and the second antenna port belong to any two different antenna port groups among the Q antenna port groups respectively, and the small-scale characteristics include a channel impulse response.

In one embodiment, the antenna port is formed by superposition of multiple antennas through antenna virtualization, and mapping coefficients from the multiple antennas to the antenna port constitute a beamforming vector. The phrase that any two of the Q antenna port groups cannot be assumed to be same refers that: beamforming vectors corresponding to any two antenna ports in the Q antenna port groups cannot be assumed to be same.

In the above embodiment, different antenna port groups may transmit the first radio signal employing different beamforming vectors, and the different beamforming vectors point to different directions respectively. When a serving base station of the UE acquires a (partial) CSI of a downlink channel, the serving base station may transmit the first radio signal on one same antenna port group through a beamforming vector pointing to the UE, to improve the quality of reception of the first radio signal. When the (partial) CSI of the downlink channel fails, the serving base station may transmit the first radio signal on Q>1 antenna port groups through different beamforming vectors respectively, to ensure that the UE can receive the first radio signal in any direction.

In one embodiment, the beamforming vector corresponding to the antenna port is formed by a product of an analog beamforming matrix and a digital beamforming vector. In one subembodiment, the Q antenna port groups correspond to Q analog beamforming matrixes respectively, and antenna ports in one same antenna port group correspond to one same analog beamforming matrix. In one subembodiment, antenna ports in different antenna port groups correspond to different analog beamforming matrixes. In one subembodiment, different antenna ports in one same antenna port group correspond to different digital beamforming vectors.

In one embodiment, the phrase that any two of the Q antenna port groups cannot be assumed to be same refers that: the UE cannot perform a combined channel estimation using reference signals transmitted by any two antenna ports in the Q antenna port groups.

In one embodiment, the P is not equal to the Q.

In one embodiment, the P is equal to the Q.

In one embodiment, the first format set further includes at least one additional transmission format different from the first transmission format and the second transmission format.

In one embodiment, the first transmission format corresponds to one of {single-antenna transmission, transmit diversity, large delay Cyclic Delay Diversity (large delay CDD), closed-loop Spatial Multiplexing (closed-loop SM), Multi-User Multiple-Input-Multiple-Output (MU-MIMO)}.

In one embodiment, different antenna ports in one same antenna port group transmit the first radio signal through one mode among {single-antenna transmission, transmit diversity, large delay CDD, closed-loop SM, MU-MIMO, TDM, Frequency Division Multiplexing (FDM), Code Division Multiplexing (CDM)}.

Specifically, according to one aspect of the present disclosure, the method includes:

receiving a second signaling.

Herein, the second signaling is a high-layer signaling, the second signaling is used for determining the first format set, the first format set is one of K candidate format sets, and the K is a positive integer greater than 1.

In one embodiment, the second signaling is a Radio Resource Control (RRC) signaling.

In one embodiment, the second signaling is UE specific.

In one embodiment, each candidate format set among the K candidate format sets includes the first transmission format. In one subembodiment, the first transmission format corresponds to transmit diversity.

In one embodiment, the candidate format set consists of two transmission formats.

In one embodiment, the candidate format set consists of three transmission formats.

In one embodiment, at least two of the K candidate format sets include different numbers of transmission formats.

Specifically, according to one aspect of the present disclosure, a time duration of time domain resources occupied by the first radio signal is unrelated to the transmission format corresponding to the first radio signal.

In one embodiment, the above aspect ensures that the processing time of the UE receiver is independent of the transmission format corresponding to the first radio signal, thus reducing the complexity of the UE.

In one embodiment, the time domain resources occupied by the first radio signal are unrelated to the transmission format corresponding to the first radio signal.

In one embodiment, the P is 1, and time domain resources occupied by any two of the Q radio sub-signals are orthogonal. In one subembodiment, time domain resources occupied by the Q radio sub-signals are consecutive. In one subembodiment, the first bit block corresponds to a first Transport Time Interval (TTI); a physical layer channel to which a given radio sub-signal is mapped, in the case of the second transmission format, corresponds to a TTI which has a less time duration than the first TTI; and the given radio sub-signal is any of the Q radio sub-signals. In one subembodiment, the Q radio sub-signals include at least two radio sub-signals, and physical layer channels to which the two radio sub-signals are mapped, in the case of the second transmission format, correspond to TTIs of different time durations.

Specifically, according to one aspect of the present disclosure, the method includes:

transmitting a third signaling.

Herein, the third signaling is used for indicating whether the first radio signal is correctly received.

In one embodiment, the third signaling includes Uplink Control Information (UCI).

In one embodiment, a physical layer channel corresponding to the third signaling includes an uplink physical layer control channel (that is, an uplink channel capable of carrying physical layer signalings only). In one embodiment, the uplink physical layer control channel is a Physical Uplink Control Channel (PUCCH).

In one embodiment, a physical layer channel corresponding to the third signaling includes an uplink physical layer data channel (that is, an uplink channel capable of carrying physical layer data). In one embodiment, the uplink physical layer data channel is a Physical Uplink Shared Channel (PUSCH).

In one embodiment, a transport channel corresponding to the third signaling is an Uplink Shared Channel (UL-SCH).

Specifically, according to one aspect of the present disclosure, the method includes:

receiving a second radio signal, the second radio signal carrying the first bit block.

Herein, a transmission format corresponding to the second radio signal is one transmission format in the first format set, and the transmission format corresponding to the second radio signal is different from the transmission format corresponding to the first radio signal.

In one embodiment, an RV corresponding to the second radio signal is different from an RV corresponding to the first radio signal.

In one embodiment, a New Data Indicator (NDI) corresponding to the second radio signal is different from an NDI corresponding to the first radio signal.

In one embodiment, the second radio signal is transmitted after the third signaling.

The present disclosure provides a method in a base station in wireless transmission, wherein the method includes:

transmitting a first signaling; and transmitting a first radio signal, the first radio signal carrying a first bit block.

Herein, the first signaling is a physical layer signaling, the first signaling is used for determining a transmission format corresponding to the first radio signal, and the first bit block includes a positive integer number of bits. The transmission format corresponding to the first radio signal is one transmission format in a first format set, and the first format set includes a first transmission format and a second transmission format. A radio signal corresponding to the first transmission format includes P radio sub-signal(s), each of the P radio sub-signal(s) carries the first bit block, each of the P radio sub-signal(s) is transmitted by a same antenna port group, and the P is a positive integer. A radio signal corresponding to the second transmission format includes Q radio sub-signals, each of the Q radio sub-signals carries the first bit block, the Q radio sub-signals are transmitted by Q antenna port groups respectively, any two of the Q antenna port groups cannot be assumed to be same, and the Q is an integer greater than 1. The antenna port group includes one or more antenna ports.

In one embodiment, time domain resources occupied by any two of the Q radio sub-signals are orthogonal.

In one embodiment, the P is greater than 1, and time domain resources occupied by any two of the P radio sub-signals are orthogonal.

In one embodiment, the P is equal to 1.

In one embodiment, the first bit block is a TB.

In one embodiment, the first bit block includes two TBs.

In one embodiment, the radio sub-signal includes a reference signal.

In one embodiment, the first signaling indicates from the first format set the transmission format corresponding to the first radio signal.

In one embodiment, a payload size of the first signaling is different for the first transmission format and the second transmission format. In one embodiment, the UE determines the transmission format corresponding to the first radio signal according to the payload size of the first signaling.

In one embodiment, a payload size of the first signaling is same for the first transmission format and the second transmission format, and the first signaling indicates explicitly the transmission format corresponding to the first radio signal. In one subembodiment, an information bit in the first signaling indicates if the transmission format corresponding to the first radio signal is the first transmission format or the second transmission format.

In one embodiment, the first signaling includes scheduling information of the first radio signal, and the scheduling information includes at least one of {occupied time-frequency resources, an MCS, an RV, a HARQ Process Number}.

In one embodiment, a physical layer channel corresponding to the first radio signal includes a downlink physical layer data channel (that is, a downlink channel capable of carrying physical layer data). In one embodiment, the downlink physical layer data channel is a PDSCH.

In one embodiment, the downlink physical layer data channel is a sPDSCH.

In one embodiment, a transport channel corresponding to the first radio signal is a DL-SCH.

In one embodiment, a physical layer channel corresponding to the first signaling includes a downlink physical layer control channel (that is, a downlink channel capable of carrying physical layer signalings only). In one embodiment, the downlink physical layer control channel is a PDCCH. In one embodiment, the downlink physical layer control channel is a sPDCCH.

In one embodiment, the first signaling is a DCI.

In one embodiment, the antenna port group includes one antenna port.

In one embodiment, the antenna port group includes more than one antenna port.

In one embodiment, at least two of the Q antenna port groups include different numbers of antenna ports.

In one embodiment, the Q antenna port groups include a same number of antenna ports.

In one embodiment, the first signaling is used for determining a number of antenna ports in the antenna port group.

In one embodiment, the phrase that any two of the Q antenna port groups cannot be assumed to be same refers that: small-scale characteristics of a radio channel over which a signal transmitted by a first antenna port is conveyed cannot be used to deduce small-scale characteristics of a radio channel over which a signal transmitted by a second antenna port is conveyed. The first antenna port and the second antenna port belong to any two different antenna port groups among the Q antenna port groups respectively, and the small-scale characteristics include a channel impulse response.

In one embodiment, the antenna port is formed by superposition of multiple antennas through antenna virtualization, and mapping coefficients from the multiple antennas to the antenna port constitute a beamforming vector. The phrase that any two of the Q antenna port groups cannot be assumed to be same refers that: beamforming vectors corresponding to any two antenna ports in the Q antenna port groups cannot be assumed to be same.

In the above embodiment, different antenna port groups may transmit the first radio signal employing different beamforming vectors, and the different beamforming vectors point to different directions respectively. When a serving base station of the UE acquires a (partial) CSI of a downlink channel, the serving base station may transmit the first radio signal on one same antenna port group through a beamforming vector pointing to the UE, to improve the quality of reception of the first radio signal. When the (partial) CSI of the downlink channel fails, the serving base station may transmit the first radio signal on Q>1 antenna port groups through different beamforming vectors respectively, to ensure that the UE can receive the first radio signal in any direction.

In one embodiment, the beamforming vector corresponding to the antenna port is formed by a product of an analog beamforming matrix and a digital beamforming vector. In one subembodiment, the Q antenna port groups correspond to Q analog beamforming matrixes respectively, and antenna ports in one same antenna port group correspond to one same analog beamforming matrix. In one subembodiment, antenna ports in different antenna port groups correspond to different analog beamforming matrixes. In one subembodiment, different antenna ports in one same antenna port group correspond to different digital beamforming vectors.

In one embodiment, the phrase that any two of the Q antenna port groups cannot be assumed to be same refers that: the UE cannot perform a combined channel estimation using reference signals transmitted by any two antenna ports in the Q antenna port groups.

In one embodiment, the P is not equal to the Q.

In one embodiment, the P is equal to the Q.

In one embodiment, the first format set further includes at least one additional transmission format different from the first transmission format and the second transmission format.

In one embodiment, the first transmission format corresponds to one of {single-antenna transmission, transmit diversity, large delay CDD, closed-loop SM, MU-MIMO}.

In one embodiment, different antenna ports in one same antenna port group transmit the first radio signal through one mode among {single-antenna transmission, transmit diversity, large delay CDD, closed-loop SM, MU-MIMO, TDM, FDM, CDM}.

Specifically, according to one aspect of the present disclosure, the method includes:

transmitting a second signaling.

Herein, the second signaling is a high-layer signaling, the second signaling is used for determining the first format set, the first format set is one of K candidate format sets, and the K is a positive integer greater than 1.

In one embodiment, the second signaling is an RRC signaling.

In one embodiment, the second signaling is UE specific.

In one embodiment, each of the K candidate format sets includes the first transmission format. In one subembodiment, the first transmission format corresponds to transmit diversity.

In one embodiment, the candidate format set consists of two transmission formats.

In one embodiment, the candidate format set consists of three transmission formats.

In one embodiment, at least two of the K candidate format sets include different numbers of transmission formats.

Specifically, according to one aspect of the present disclosure, a time duration of time domain resources occupied by the first radio signal is unrelated to the transmission format corresponding to the first radio signal.

In one embodiment, the above aspect ensures that the processing time of the UE receiver is independent of the transmission format corresponding to the first radio signal, thus reducing the complexity of the UE.

In one embodiment, the time domain resources occupied by the first radio signal are unrelated to the transmission format corresponding to the first radio signal.

In one embodiment, the P is 1, and time domain resources occupied by any two of the Q radio sub-signals are orthogonal. In one subembodiment, time domain resources occupied by the Q radio sub-signals are consecutive. In one subembodiment, the first bit block corresponds to a first TTI; a physical layer channel to which a given radio sub-signal is mapped, in the case of the second transmission format, corresponds to a TTI which has a less time duration than the first TTI; and the given radio sub-signal is any of the Q radio sub-signals. In one subembodiment, the Q radio sub-signals include at least two radio sub-signals, and physical layer channels to which the two radio sub-signals are mapped, in the case of the second transmission format, correspond to TTIs of different time durations.

Specifically, according to one aspect of the present disclosure, the method includes:

receiving a third signaling.

Herein, the third signaling is used for indicating whether the first radio signal is correctly received.

In one embodiment, the third signaling includes an UCI.

In one embodiment, a physical layer channel corresponding to the third signaling includes an uplink physical layer control channel (that is, an uplink channel capable of carrying physical layer signalings only). In one embodiment, the uplink physical layer control channel is a PUCCH.

In one embodiment, a physical layer channel corresponding to the third signaling includes an uplink physical layer data channel (that is, an uplink channel capable of carrying physical layer data). In one embodiment, the uplink physical layer data channel is a PUSCH.

In one embodiment, a transport channel corresponding to the third signaling is an UL-SCH.

Specifically, according to one aspect of the present disclosure, the method includes:

transmitting a second radio signal, the second radio signal carrying the first bit block.

Herein, a transmission format corresponding to the second radio signal is one transmission format in the first format set, and the transmission format corresponding to the second radio signal is different from the transmission format corresponding to the first radio signal.

In one embodiment, an RV corresponding to the second radio signal is different from an RV corresponding to the first radio signal.

In one embodiment, an NDI corresponding to the second radio signal is different from an NDI corresponding to the first radio signal.

The present disclosure provides a UE in wireless transmission, wherein the UE includes:
- a first receiver, to receive a first signaling; and
- a second receiver, to receive a first radio signal, the first radio signal carrying a first bit block.

Herein, the first signaling is a physical layer signaling, the first signaling is used for determining a transmission format corresponding to the first radio signal, and the first bit block includes a positive integer number of bits. The transmission format corresponding to the first radio signal is one transmission format in a first format set, and the first format set includes a first transmission format and a second transmission format. A radio signal corresponding to the first transmission format includes P radio sub-signal(s), each of the P radio sub-signal(s) carries the first bit block, each of the P radio sub-signal(s) is transmitted by a same antenna port group, and the P is a positive integer. A radio signal corresponding to the second transmission format includes Q radio sub-signals, each of the Q radio sub-signals carries the first bit block, the Q radio sub-signals are transmitted by Q antenna port groups respectively, any two of the Q antenna port groups cannot be assumed to be same, and the Q is an integer greater than 1. The antenna port group includes one or more antenna ports.

In one embodiment, time domain resources occupied by any two of the Q radio sub-signals are orthogonal.

In one embodiment, the P is greater than 1, and time domain resources occupied by any two of the P radio sub-signals are orthogonal.

In one embodiment, the first signaling includes scheduling information of the first radio signal, and the scheduling information includes at least one of {occupied time-frequency resources, an MCS, an RV, a HARQ Process Number}.

In one embodiment, the first signaling is a DCI.

In one embodiment, the first transmission format corresponds to one of {single-antenna transmission, transmit diversity, large delay CDD, closed-loop SM, MU-MIMO}.

Specifically, the above UE is characterized in that the second receiver further receives a second signaling.

Herein, the second signaling is a high-layer signaling, the second signaling is used for determining the first format set, the first format set is one of K candidate format sets, and the K is a positive integer greater than 1.

In one embodiment, the second signaling is an RRC signaling.

In one embodiment, each of the K candidate format sets includes the first transmission format. In one subembodiment, the first transmission format corresponds to transmit diversity.

Specifically, the above UE is characterized in that a time duration of time domain resources occupied by the first radio signal is unrelated to the transmission format corresponding to the first radio signal.

Specifically, the above UE includes:
- a first transmitter, to transmit a third signaling.

Herein, the third signaling is used for indicating whether the first radio signal is correctly received.

In one embodiment, the third signaling includes an UCI.

Specifically, the above UE is characterized in that the second receiver further receives a second radio signal, the second radio signal carrying the first bit block.

Herein, a transmission format corresponding to the second radio signal is one transmission format in the first format set, and the transmission format corresponding to the second radio signal is different from the transmission format corresponding to the first radio signal.

The present disclosure provides a base station in wireless transmission, wherein the base station includes:
- a second transmitter, to transmit a first signaling; and
- a third transmitter, to transmit a first radio signal, the first radio signal carrying a first bit block.

Herein, the first signaling is a physical layer signaling, the first signaling is used for determining a transmission format corresponding to the first radio signal, and the first bit block includes a positive integer number of bits. The transmission format corresponding to the first radio signal is one transmission format in a first format set, and the first format set includes a first transmission format and a second transmission format. A radio signal corresponding to the first transmission format includes P radio sub-signal(s), each of the P radio sub-signal(s) carries the first bit block, each of the P radio sub-signal(s) is transmitted by a same antenna port group, and the P is a positive integer. A radio signal corresponding to the second transmission format includes Q radio sub-signals, each of the Q radio sub-signals carries the first bit block, the Q radio sub-signals are transmitted by Q antenna port groups respectively, any two of the Q antenna port groups cannot be assumed to be same, and the Q is an integer greater than 1. The antenna port group includes one or more antenna ports.

In one embodiment, time domain resources occupied by any two of the Q radio sub-signals are orthogonal.

In one embodiment, the P is greater than 1, and time domain resources occupied by any two of the P radio sub-signals are orthogonal.

In one embodiment, the first signaling includes scheduling information of the first radio signal, and the scheduling information includes at least one of {occupied time-frequency resources, an MCS, an RV, a HARQ Process Number}.

In one embodiment, the first signaling is a DCI.

In one embodiment, the first transmission format corresponds to one of {single-antenna transmission, transmit diversity, large delay CDD, closed-loop SM, MU-MIMO}.

Specifically, the above base station is characterized in that the third transmitter further transmits a second signaling.

Herein, the second signaling is a high-layer signaling, the second signaling is used for determining the first format set, the first format set is one of K candidate format sets, and the K is a positive integer greater than 1.

In one embodiment, the second signaling is an RRC signaling.

In one embodiment, each of the K candidate format sets includes the first transmission format. In one subembodiment, the first transmission format corresponds to transmit diversity.

Specifically, the above base station is characterized in that a time duration of time domain resources occupied by the first radio signal is unrelated to the transmission format corresponding to the first radio signal.

Specifically, the above base station includes:
- a third receiver, to receive a third signaling.

Herein, the third signaling is used for indicating whether the first radio signal is correctly received.

In one embodiment, the third signaling includes an UCI.

Specifically, the above base station is characterized in that the third transmitter further transmits a second radio signal, the second radio signal carrying the first bit block.

Herein, a transmission format corresponding to the second radio signal is one transmission format in the first format set, and the transmission format corresponding to the second radio signal is different from the transmission format corresponding to the first radio signal.

Compared with conventional schemes, the present disclosure has the following benefits.

The base station can select the transmission mode of downlink data flexibly according to the acquired CSI of a downlink channel targeting the served UE, thereby keeping the robustness of the downlink transmission all the time.

When the downlink channel CSI acquired previously fails due to some reasons (for example, movement of UE, etc.) and the UE cannot receive downlink data correctly, the base station can change to the beam sweeping scheme in time to transmit the retransmission data of the UE, thereby guaranteeing the quality of retransmission and reducing the delay of retransmission.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments in the present disclosure and the characteristics of the embodiments may be arbitrarily combined if no conflict is caused.

Embodiment 1

Figure 1:
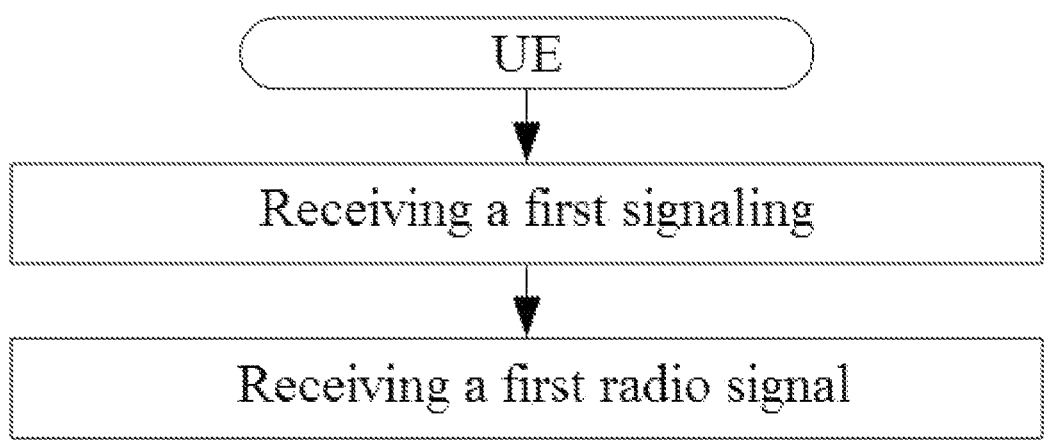
FIG. 1 is a flowchart of a first signaling and a first radio signal according to one embodiment of the present disclosure.

Embodiment 1 illustrates an example of a flowchart of a first signaling and a first radio signal, as shown in FIG. 1.

In Embodiment 1, the UE in the present disclosure receives a first signaling, and receives a first radio signal, the first radio signal carrying a first bit block. Herein, the first signaling is a physical layer signaling, the first signaling is used for determining a transmission format corresponding to the first radio signal, and the first bit block includes a positive integer number of bits; the transmission format corresponding to the first radio signal is one transmission format in a first format set, and the first format set includes a first transmission format and a second transmission format; a radio signal corresponding to the first transmission format includes P radio sub-signal(s), each of the P radio sub-signal(s) carries the first bit block, each of the P radio sub-signal(s) is transmitted by a same antenna port group, and the P is a positive integer; a radio signal corresponding to the second transmission format includes Q radio sub-signals, each of the Q radio sub-signals carries the first bit block, the Q radio sub-signals are transmitted by Q antenna port groups respectively, any two of the Q antenna port groups cannot be assumed to be same, and the Q is an integer greater than 1; and the antenna port group includes one or more antenna ports.

In one embodiment, time domain resources occupied by any two of the Q radio sub-signals are orthogonal.

In one embodiment, the phrase that a given radio signal carrying a given bit block refers that: the given radio signal is an output after the given bit block experiences in sequence channel coding, modulation mapper, layer mapper, precoding, resource element mapper, and generation of OFDM signals.

In one embodiment, the phrase that a given radio signal carrying a given bit block refers that: the given bit block is used for generating the given radio signal.

In one embodiment, the P is greater than 1, and time domain resources occupied by any two of the P radio sub-signals are orthogonal.

In one embodiment, the P is equal to 1.

In one embodiment, the first bit block is a TB.

In one embodiment, the first bit block includes two TBs.

In one embodiment, the radio sub-signal includes a reference signal.

In one embodiment, the first signaling indicates from the first format set the transmission format corresponding to the first radio signal.

In one embodiment, a payload size of the first signaling is different for the first transmission format and the second transmission format. In one embodiment, the UE determines the transmission format corresponding to the first radio signal according to the payload size of the first signaling.

In one embodiment, a payload size of the first signaling is the same for the first transmission format and the second transmission format, and the first signaling indicates explicitly the transmission format corresponding to the first radio signal. In one subembodiment, an information bit in the first signaling indicates if the transmission format corresponding to the first radio signal is the first transmission format or the second transmission format.

In one embodiment, the first signaling includes scheduling information of the first radio signal, and the scheduling information includes at least one of {occupied time-frequency resources, an MCS, an RV, a HARQ Process Number}.

In one embodiment, a physical layer channel corresponding to the first radio signal includes a downlink physical layer data channel (that is, a downlink channel capable of carrying physical layer data). In one embodiment, the downlink physical layer data channel is a PDSCH.

In one embodiment, the downlink physical layer data channel is a sPDSCH.

In one embodiment, a transport channel corresponding to the first radio signal is a DL-SCH.

In one embodiment, a physical layer channel corresponding to the first signaling includes a downlink physical layer control channel (that is, a downlink channel capable of carrying physical layer signalings only). In one embodiment, the downlink physical layer control channel is a DCCH. In one embodiment, the downlink physical layer control channel is a sPDCCH.

In one embodiment, the first signaling is a DCI.

In one embodiment, the antenna port group includes one antenna port.

In one embodiment, the antenna port group includes more than one antenna port.

In one embodiment, at least two of the Q antenna port groups include different numbers of antenna ports.

In one embodiment, the Q antenna port groups include a same number of antenna ports.

In one embodiment, the first signaling is used for determining a number of antenna ports in the antenna port group.

In one embodiment, the phase that any two of the Q antenna port groups cannot be assumed to be same refers that: small-scale characteristics of a radio channel over which a signal transmitted by a first antenna port is conveyed cannot be used to deduce small-scale characteristics of a radio channel over which a signal transmitted by a second antenna port is conveyed. The first antenna port and the second antenna port belong to any two different antenna port groups among the Q antenna port groups respectively, and the small-scale characteristics include a channel impulse response.

In one embodiment, the antenna port is formed by superposition of multiple antennas through antenna virtualization, and mapping coefficients from the multiple antennas to the antenna port constitute a beamforming vector. The phrase that any two of the Q antenna port groups cannot be assumed to be same refers that: beamforming vectors corresponding to any two antenna ports in the Q antenna port groups cannot be assumed to be same.

In the above embodiment, different antenna port groups may transmit the first radio signal employing different beamforming vectors, and the different beamforming vectors point to different directions respectively. When a serving base station of the UE acquires a (partial) CSI of a downlink channel, the serving base station may transmit the first radio signal on one same antenna port group through a beamforming vector pointing to the UE, to improve the quality of reception of the first radio signal. When the (partial) CSI of the downlink channel fails, the serving base station may transmit the first radio signal on Q>1 antenna port groups through different beamforming vectors respectively, to ensure that the UE can receive the first radio signal in any direction.

In one embodiment, the beamforming vector corresponding to the antenna port is formed by a product of an analog beamforming matrix and a digital beamforming vector. In one subembodiment, the Q antenna port groups correspond to Q analog beamforming matrixes respectively, and antenna ports in one same antenna port group correspond to one same analog beamforming matrix. In one subembodiment, antenna ports in different antenna port groups correspond to different analog beamforming matrixes. In one subembodiment, different antenna ports in one same antenna port group correspond to different digital beamforming vectors.

In one embodiment, the phrase that any two of the Q antenna port groups cannot be assumed to be same refers that: the UE cannot perform a combined channel estimation using reference signals transmitted by any two antenna ports in the Q antenna port groups.

In one embodiment, the P is not equal to the Q.

In one embodiment, the P is equal to the Q.

In one embodiment, the first format set further includes at least one additional transmission format different from the first transmission format and the second transmission format.

In one embodiment, the first transmission format corresponds to one of {single-antenna transmission, transmit diversity, large delay CDD, closed-loop SM, MU-MIMO}.

In one embodiment, different antenna ports in one same antenna port group transmit the first radio signal through one mode among {single-antenna transmission, transmit diversity, large delay CDD, closed-loop SM, MU-MIMO, TDM, FDM, CDM}.

Embodiment 2

Figure 2:
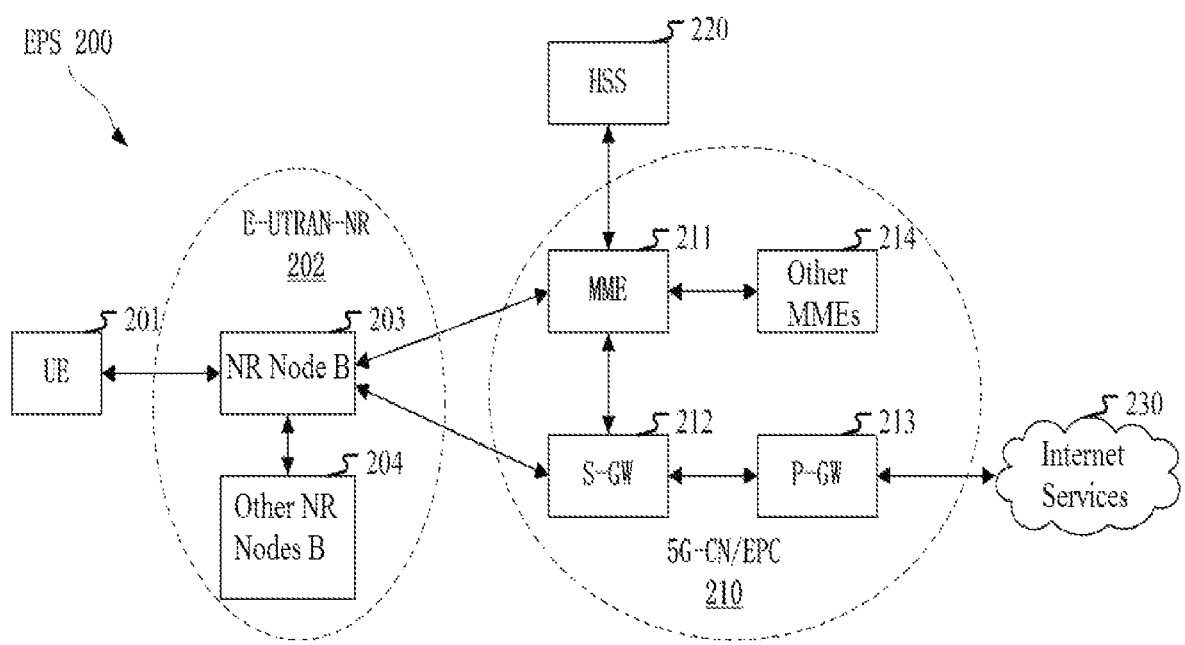
FIG. 2 is a diagram illustrating a network architecture according to one embodiment of the present disclosure.

Embodiment 2 illustrates an example of a diagram of a network architecture, as shown in FIG. 2.

FIG. 2 illustrates a network architecture 200 of Long-Term Evolution (LTE), Long-Term Evolution Advanced (LTE-A) and future 5G systems. The LTE, LTE-A and 5G system network architecture 200 may be called an Evolved Packet System (EPS) 200. The EPS 200 may include one or more UEs 201, an Evolved UMTS Terrestrial Radio Access Network-New Radio (E-UTRAN-NR) 202, a 5G-Core Network/Evolved Packet Core (5G-CN/EPC) 210, a Home Subscriber Server (HSS) 220 and an Internet Service 230. Herein, the UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services. The E-UTRAN-NR includes an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the 5G-CN/EPC 210 via an S1 interface. The 5G-CN/EPC 210 includes an MME 211, other MMEs 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one embodiment, the gNB 203 corresponds to the base station in the present disclosure.

In one embodiment, the UE 201 corresponds to the UE in the present disclosure.

In one subembodiment, the gNB 203 supports multi-antenna transmission.

In one subembodiment, the UE 201 supports multi-antenna transmission.

Embodiment 3

Figure 3:
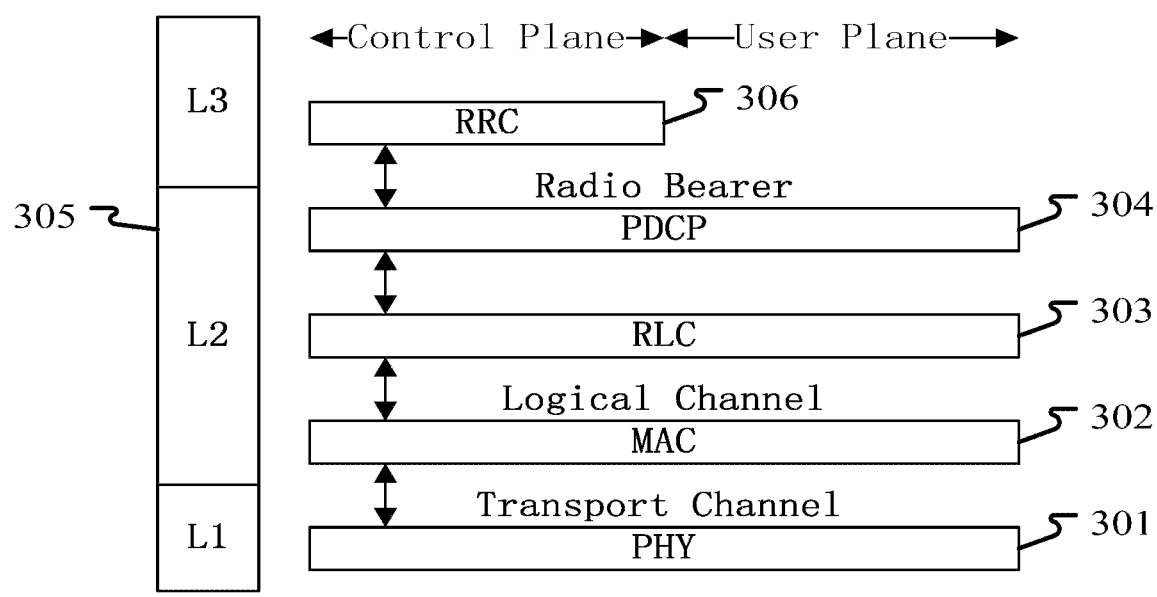
FIG. 3 is a diagram illustrating an embodiment of a radio protocol architecture of a user plane and a control plane according to one embodiment of the present disclosure.

Embodiment 3 illustrates an example of a diagram of an embodiment of a radio protocol architecture of a user plane and a control plane, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are layer 1, layer 2 and layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at the P-GW 213 of the network side and an application layer terminated at the other side (i.e. a peer UE, a server, etc.) of the connection. The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of lost packets, and reordering of lost packets to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring lower layers using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the PHY 301.

In one embodiment, the first radio signal in the present disclosure is generated by the PHY 301.

In one embodiment, the second signaling in the present disclosure is generated by the RRC sublayer 306.

In one embodiment, the third signaling in the present disclosure is generated by the PHY 301.

In one embodiment, the second radio signal in the present disclosure is generated by the PHY 301.

Embodiment 4

Figure 4:
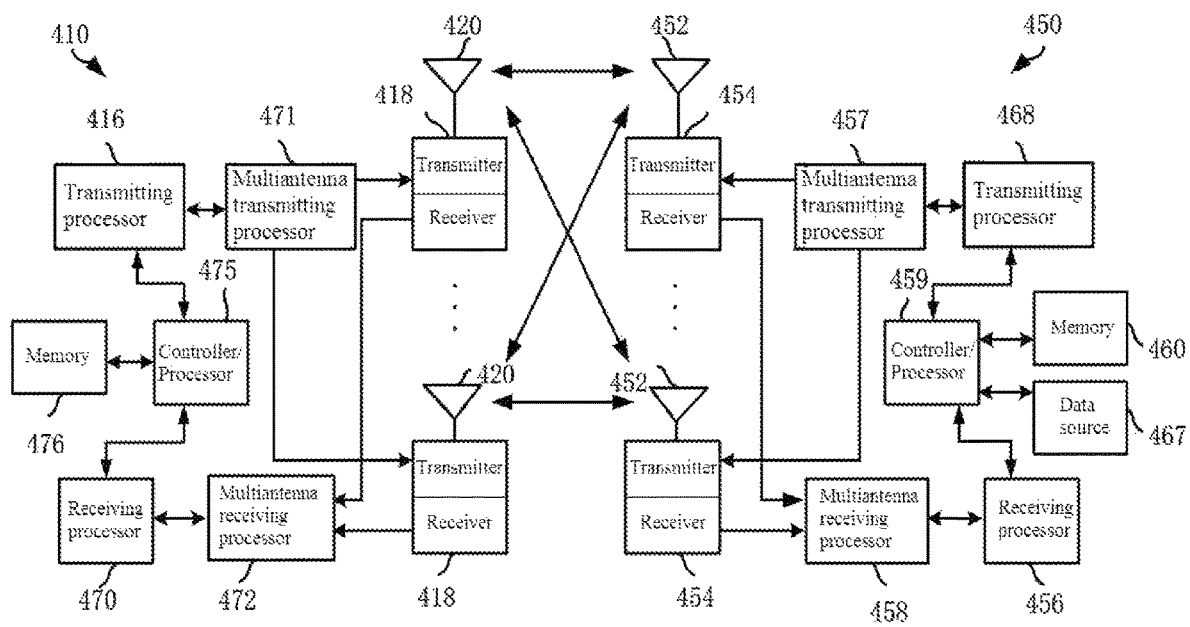
FIG. 4 is a diagram illustrating a New Radio (NR) node and a UE according to one embodiment of the present disclosure.

Embodiment 4 illustrates an example of a diagram of an NR node and a UE, as shown in FIG. 4. FIG. 4 is a block diagram of a UE 450 and a gNB 410 that communicate with each other in an access network.

The gNB 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In Downlink (DL) transmission, at the gNB 410, a higher-layer packet from a core network is provided to the controller/processor 475. The controller/processor 475 provides a function of layer 2. In downlink transmission, the controller/processor 475 provides header compression, encryption, packet segmentation and reordering, multiplexing between a logical channel and a transport channel, and a radio resource allocation for the UE 450 based on various priorities. The controller/processor 475 is also in charge of HARQ operation, retransmission of lost packets, and a signaling to the UE 450. The transmitting processor 416 and the multi-antenna transmitting processor 471 perform signal processing functions used for layer 1 (that is, physical layer). The transmitting processor 416 performs encoding and interleaving so as to ensure a FEC (Forward Error Correction) at the UE 450 side and the mapping to signal clusters corresponding to different modulation schemes (i.e., BPSK, QPSK, M-PSK M-QAM, etc.). The multi-antenna transmitting processor 471 processes the encoded and modulated symbols by digital spatial precoding (including precoding based on codebook and precoding based on non-codebook) and beamforming processing to generate one or more spatial streams. The transmitting processor 416 subsequently maps each spatial stream into subcarriers to be multiplexed with reference signals (i.e., pilots) in a time domain and/or frequency domain, and then processes it with Inverse Fast Fourier Transform (IFFT) to generate a physical channel carrying a time-domain multicarrier symbol stream. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to the corresponding antenna 420.

In downlink transmission, at the UE 450, each receiver 454 receives a signal via the corresponding antenna 452. Each receiver 454 recovers the information modulated to an RF carrier and converts a radio frequency stream into a baseband multicarrier symbol stream to provide to the receiving processor 456. The receiving processor 456 and the multi-antenna receiving processor 458 perform signal processing functions of layer 1. The multi-antenna receiving processor 458 processes the baseband multicarrier symbol stream coming from the receiver 454 by a receiving analog precoding/beamforming operation. The receiving processor 458 converts the baseband multicarrier symbol stream subjected to a receiving analog precoding/beamforming operation from a time domain into a frequency domain using FFT (Fast Fourier Transform). In the frequency domain, physical layer data signals and reference signals are demultiplexed by the receiving processor 456, wherein the reference signals are used for channel estimation, and the data signals are subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signals on the physical channel transmitted by the gNB 410. Next, the higher-layer data and control signals are provided to the controller/processor 459. The controller/processor 459 performs functions of layer 2. The controller/processor 459 may be connected to the memory 460 that stores program codes and data. The memory 460 may be called a computer readable media. In downlink transmission, the controller/processor 459 provides multiplexing between the transport channel and the logical channel, packet reassembling, decryption, header decompression, and control signal processing so as to recover higher-layer packets coming from the core network. The higher-layer packets are then provided to all protocol layers above layer 2, or various control signals can be provided to layer 3 for processing. The controller/processor 459 can also perform error detection using ACK and/or NACK protocols to support the HARQ operation.

In the uplink transmission, at the UE 450, the data source 467 provides higher-layer packets to the controller/processor 459. The data source 467 represents all protocol layers above L2 layer. Similar as the transmitting function of the gNB 410 described in downlink transmission, the controller/processor 459 provides header compression, encryption, packet segmentation and reordering, and multiplexing between a logical channel and a transport channel based on the radio resource allocation of the base station 410 so as to provide the functions of layer 2 used for the control plane and user plane. The controller/processor 459 is also in charge of HARQ operation, retransmission of lost packets, and signaling to the gNB 410. The transmitting processor 468 conducts modulation mapping and channel encoding processing; the multi-antenna transmitting processor 457 performs digital multi-antenna spatial precoding (including precoding based on codebook and precoding based on non-codebook) and beamforming processing; and subsequently, the transmitting processor 468 modulates the generated spatial streams into one or multicarrier/single-carrier symbol streams, which is/are subjected to an analog precoding/beamforming operation in the multi-antenna transmitting processor 457 and then is provided to the antennas 452 via the transmitter 454. Each transmitter 452 first converts baseband symbol streams provided by the multi-antenna transmitting processor 457 into radio frequency symbol streams and then provides the radio frequency symbol streams to the corresponding antenna 452.

In uplink transmission, the function of the gNB 410 is similar as the receiving function of the UE 450 described in the downlink transmission. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of layer 1. The controller/processor 475 provides functions of layer 2. The controller/processor 475 may be connected to the memory 476 that stores program codes and data. The memory 476 may be called a computer readable media. In uplink transmission, the controller/processor 475 provides de-multiplexing between the transport channel and the logical channel, packet reassembling, decryption, header decompression, and control signal processing so as to recover higher-layer packets coming from the UE 450. The higher-layer packets, coming from the controller/processor 475, may be provided to the core network. The controller/processor 475 can also perform error detection using ACK and/or NACK protocols to support the HARQ operation.

In one embodiment, the UE 450 includes at least one processor and at least one memory. The at least one memory includes computer program codes. The at least one memory and the computer program codes are configured to be used in collaboration with the at least one processor. The UE 450 at least receives the first signaling in the present disclosure, and receives the first radio signal in the present disclosure, the first radio signal carrying a first bit block. Herein, the first signaling is a physical layer signaling, the first signaling is used for determining a transmission format corresponding to the first radio signal, and the first bit block includes a positive integer number of bits; the transmission format corresponding to the first radio signal is one transmission format in a first format set, and the first format set includes a first transmission format and a second transmission format; a radio signal corresponding to the first transmission format includes P radio sub-signal(s), each of the P radio sub-signal(s) carries the first bit block, each of the P radio sub-signal(s) is transmitted by a same antenna port group, and the P is a positive integer; a radio signal corresponding to the second transmission format includes Q radio sub-signals, each of the Q radio sub-signals carries the first bit block, the Q radio sub-signals are transmitted by Q antenna port groups respectively, any two of the Q antenna port groups cannot be assumed to be same, and the Q is an integer greater than 1; and the antenna port group includes one or more antenna ports.

In one embodiment, the UE 450 includes a memory that stores a computer readable instruction program. The computer readable instruction program generates an action when executed by at least one processor. The action includes: receiving the first signaling in the present disclosure, and receiving the first radio signal in the present disclosure, the first radio signal carrying a first bit block. Herein, the first signaling is a physical layer signaling, the first signaling is used for determining a transmission format corresponding to the first radio signal, and the first bit block includes a positive integer number of bits; the transmission format corresponding to the first radio signal is one transmission format in a first format set, and the first format set includes a first transmission format and a second transmission format; a radio signal corresponding to the first transmission format includes P radio sub-signal(s), each of the P radio sub-signal(s) carries the first bit block, each of the P radio sub-signal(s) is transmitted by a same antenna port group, and the P is a positive integer; a radio signal corresponding to the second transmission format includes Q radio sub-signals, each of the Q radio sub-signals carries the first bit block, the Q radio sub-signals are transmitted by Q antenna port groups respectively, any two of the Q antenna port groups cannot be assumed to be same, and the Q is an integer greater than 1; and the antenna port group includes one or more antenna ports.

In one subembodiment, the gNB 410 includes at least one processor and at least one memory. The at least one memory includes computer program codes. The at least one memory and the computer program codes are configured to be used in collaboration with the at least one processor. The gNB 410 at least transmits the first signaling in the present disclosure, and transmits the first radio signal in the present disclosure, the first radio signal carrying a first bit block. Herein, the first signaling is a physical layer signaling, the first signaling is used for determining a transmission format corresponding to the first radio signal, and the first bit block includes a positive integer number of bits; the transmission format corresponding to the first radio signal is one transmission format in a first format set, and the first format set includes a first transmission format and a second transmission format; a radio signal corresponding to the first transmission format includes P radio sub-signal(s), each of the P radio sub-signal(s) carries the first bit block, each of the P radio sub-signal(s) is transmitted by a same antenna port group, and the P is a positive integer; a radio signal corresponding to the second transmission format includes Q radio sub-signals, each of the Q radio sub-signals carries the first bit block, the Q radio sub-signals are transmitted by Q antenna port groups respectively, any two of the Q antenna port groups cannot be assumed to be same, and the Q is an integer greater than 1; and the antenna port group includes one or more antenna ports.

In one subembodiment, the gNB 410 includes a memory that stores a computer readable instruction program. The computer readable instruction program generates an action when executed by at least one processor. The action includes: transmitting the first signaling in the present disclosure, and transmitting the first radio signal in the present disclosure, the first radio signal carrying a first bit block. Herein, the first signaling is a physical layer signaling, the first signaling is used for determining a transmission format corresponding to the first radio signal, and the first bit block includes a positive integer number of bits; the transmission format corresponding to the first radio signal is one transmission format in a first format set, and the first format set includes a first transmission format and a second transmission format; a radio signal corresponding to the first transmission format includes P radio sub-signal(s), each of the P radio sub-signal(s) carries the first bit block, each of the P radio sub-signal(s) is transmitted by a same antenna port group, and the P is a positive integer; a radio signal corresponding to the second transmission format includes Q radio sub-signals, each of the Q radio sub-signals carries the first bit block, the Q radio sub-signals are transmitted by Q antenna port groups respectively, any two of the Q antenna port groups cannot be assumed to be same, and the Q is an integer greater than 1; and the antenna port group includes one or more antenna ports.

In one embodiment, the gNB 410 corresponds to the base station in the present disclosure.

In one embodiment, the UE 450 corresponds to the UE in the present disclosure.

In one embodiment, at least one of {the antenna 452, the receiver 454, the receiving processor 456, the multi-antenna receiving processor 458, the controller/processor 459, the memory 460, the data source 467} is used for receiving the first signaling in the present disclosure; and at least one of {the antenna 420, the transmitter 418, the transmitting processor 416, the multi-antenna transmitting processor 471, the controller/processor 475, the memory 476} is used for transmitting the first signaling in the present disclosure.

In one embodiment, at least one of {the antenna 452, the transmitter 454, the transmitting processor 468, the multi-antenna transmitting processor 457, the controller/processor 459, the memory 460, the data source 467} is used for receiving the first radio signal in the present disclosure; and at least one of {the antenna 420, the receiver 418, the receiving processor 470, the multi-antenna receiving processor 472, the controller/processor 475, the memory 476} is used for transmitting the first radio signal in the present disclosure.

In one embodiment, at least one of {the antenna 452, the receiver 454, the receiving processor 456, the multi-antenna receiving processor 458, the controller/processor 459, the memory 460, the data source 467} is used for receiving the second signaling in the present disclosure; and at least one of {the antenna 420, the transmitter 418, the transmitting processor 416, the multi-antenna transmitting processor 471, the controller/processor 475, the memory 476} is used for transmitting the second signaling in the present disclosure.

In one embodiment, at least one of {the antenna 420, the receiver 418, the receiving processor 470, the multi-antenna receiving processor 472, the controller/processor 475, the memory 476} is used for receiving the third signaling in the present disclosure; and at least one of {the antenna 452, the transmitter 454, the transmitting processor 468, the multi-antenna transmitting processor 457, the controller/processor 459, the memory 460, the data source 467} is used for transmitting the third signaling in the present disclosure.

In one embodiment, at least one of {the antenna 452, the transmitter 454, the transmitting processor 468, the multi-antenna transmitting processor 457, the controller/processor 459, the memory 460, the data source 467} is used for receiving the second radio signal in the present disclosure; and at least one of {the antenna 420, the receiver 418, the receiving processor 470, the multi-antenna receiving processor 472, the controller/processor 475, the memory 476} is used for transmitting the second radio signal in the present disclosure.

Embodiment 5

Figure 5:
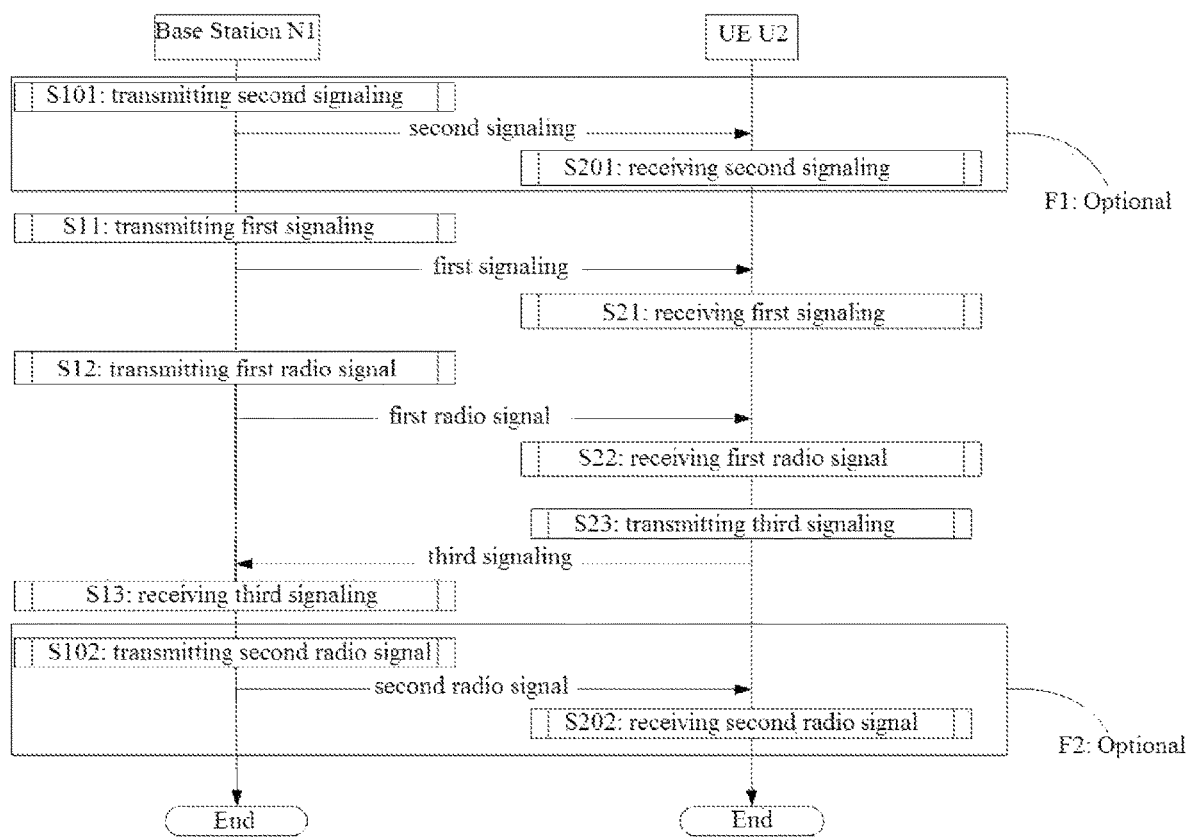
FIG. 5 is a flowchart of a wireless transmission according to one embodiment of the present disclosure.

Embodiment 5 illustrates an example of a flowchart of a wireless transmission, as shown in FIG. 5. In FIG. 5, a base station N1 is a maintenance base station for a serving cell of a UE U2. In FIG. 5, steps marked in box F1 and box F2 are optional respectively.

The N1 transmits a second signaling in S101, transmits a first signaling in S11, transmits a first radio signal in S12, receives a third signaling in S13, and transmits a second radio signal in S102.

The U2 receives a second signaling in S201, receives a first signaling in S21, receives a first radio signal in S22, transmits a third signaling in S23, and receives a second radio signal in S202.

In Embodiment 5, the first signaling is a physical layer signaling, and the first signaling is used for determining a transmission format corresponding to the first radio signal. The first radio signal carries a first bit block, and the first bit block includes a positive integer number of bits. The transmission format corresponding to the first radio signal is one transmission format in a first format set, the second signaling is used for determining the first format set, and the first format set includes a first transmission format and a second transmission format. The second signaling is a high-layer signaling, the first format set is one of K candidate format sets, and the K is a positive integer greater than 1. The third signaling is used for indicating whether the first radio signal is correctly received. The second radio signal carries the first bit block, a transmission format corresponding to the second radio signal is one transmission format in the first format set, and the transmission format corresponding to the second radio signal is different from the transmission format corresponding to the first radio signal. A radio signal corresponding to the first transmission format includes P radio sub-signal(s), each of the P radio sub-signal(s) carries the first bit block, each of the P radio sub-signal(s) is transmitted by a same antenna port group, and the P is a positive integer. A radio signal corresponding to the second transmission format includes Q radio sub-signals, each of the Q radio sub-signals carries the first bit block, the Q radio sub-signals are transmitted by Q antenna port groups respectively, any two of the Q antenna port groups cannot be assumed to be same, and the Q is an integer greater than 1. The antenna port group includes one or more antenna ports.

In one embodiment, time domain resources occupied by any two of the Q radio sub-signals are orthogonal.

In one embodiment, the P is greater than 1, and time domain resources occupied by any two of the P radio sub-signals are orthogonal.

In one embodiment, the P is equal to 1.

In one embodiment, the first bit block is a TB.

In one embodiment, the first bit block includes two TBs.

In one embodiment, the radio sub-signal includes a reference signal.

In one embodiment, the first signaling indicates from the first format set the transmission format corresponding to the first radio signal.

In one embodiment, a payload size of the first signaling is different for the first transmission format and the second transmission format. In one subembodiment, the UE determines the transmission format corresponding to the first radio signal according to the payload size of the first signaling.

In one embodiment, a payload size of the first signaling is same for the first transmission format and the second transmission format, and the first signaling indicates explicitly the transmission format corresponding to the first radio signal. In one subembodiment, an information bit in the first signaling indicates if the transmission format corresponding to the first radio signal is the first transmission format or the second transmission format.

In one embodiment, the first signaling includes scheduling information of the first radio signal, and the scheduling information includes at least one of {occupied time-frequency resources, an MCS, an RV, a HARQ Process Number}.

In one embodiment, the first signaling is a DCI.

In one embodiment, the phrase that any two of the Q antenna port groups cannot be assumed to be same refers that: small-scale characteristics of a radio channel over which a signal transmitted by a first antenna port is conveyed cannot be used to deduce small-scale characteristics of a radio channel over which a signal transmitted by a second antenna port is conveyed. The first antenna port and the second antenna port belong to any two different antenna port groups among the Q antenna port groups respectively, and the small-scale characteristics include a channel impulse response.

In one embodiment, the antenna port is formed by superposition of multiple antennas through antenna virtualization, and mapping coefficients from the multiple antennas to the antenna port constitute a beamforming vector. The phrase that any two of the Q antenna port groups cannot be assumed to be same refers that: beamforming vectors corresponding to any two antenna ports in the Q antenna port groups cannot be assumed to be same.

In one subembodiment, the beamforming vector corresponding to the antenna port is formed by a product of an analog beamforming matrix and a digital beamforming vector. In one subembodiment, the Q antenna port groups correspond to Q analog beamforming matrixes respectively, the beamforming vector corresponding to the antenna port is formed by a product of the analog beamforming matrix and a digital beamforming vector, that is, $w_{l,q}=C_q b_{l,q}$, where $1 \leq q \leq Q$, $w_{l,q}$ represents the beamforming vector corresponding to the lth antenna port in the qth antenna port group, $C_q$ represents the analog beamforming matrix corresponding to the qth antenna port group, and $b_{l,q}$ represents the digital beamforming vector corresponding to the lth antenna port in the qth antenna port group.

In one subembodiment, different antenna port groups correspond to different analog beamforming matrixes, that is, if $1 \leq q1 \leq Q$, $1 \leq q2 \leq Q$, $q1 \neq q2$, then $C_{q1} \neq C_{q2}$.

In one subembodiment, antenna ports in one same antenna port group correspond to different digital beamforming vectors, that is, if $l1 \neq l2$, then $b_{l1,q} \neq b_{l2,q}$.

In one embodiment, the phrase that any two of the Q antenna port groups cannot be assumed to be same refers that: the UE cannot perform a combined channel estimation using reference signals transmitted by any two antenna ports in the Q antenna port groups.

In one embodiment, the first format set further includes at least one additional transmission format different from the first transmission format and the second transmission format.

In one embodiment, the first transmission format corresponds to one of {single-antenna transmission, transmit diversity, large delay CDD, closed-loop SM, MU-MIMO}.

In one embodiment, different antenna ports in one same antenna port group transmit the first radio signal through one mode among {single-antenna transmission, transmit diversity, large delay CDD, closed-loop SM, MU-MIMO, TDM, FDM, CDM}.

In one embodiment, the second signaling is an RRC signaling.

In one embodiment, the second signaling is UE specific.

In one embodiment, each of the K candidate format sets includes the first transmission format. In one subembodiment, the first transmission format corresponds to transmit diversity.

In one embodiment, the candidate format set consists of two transmission formats.

In one embodiment, the candidate format set consists of three transmission formats.

In one embodiment, at least two of the K candidate format sets include different numbers of transmission formats.

In one embodiment, the third signaling includes an UCI.

In one embodiment, an RV corresponding to the second radio signal is different from an RV corresponding to the first radio signal.

In one embodiment, an NDI corresponding to the second radio signal is different from an NDI corresponding to the first radio signal.

Embodiment 6

Figure 6:
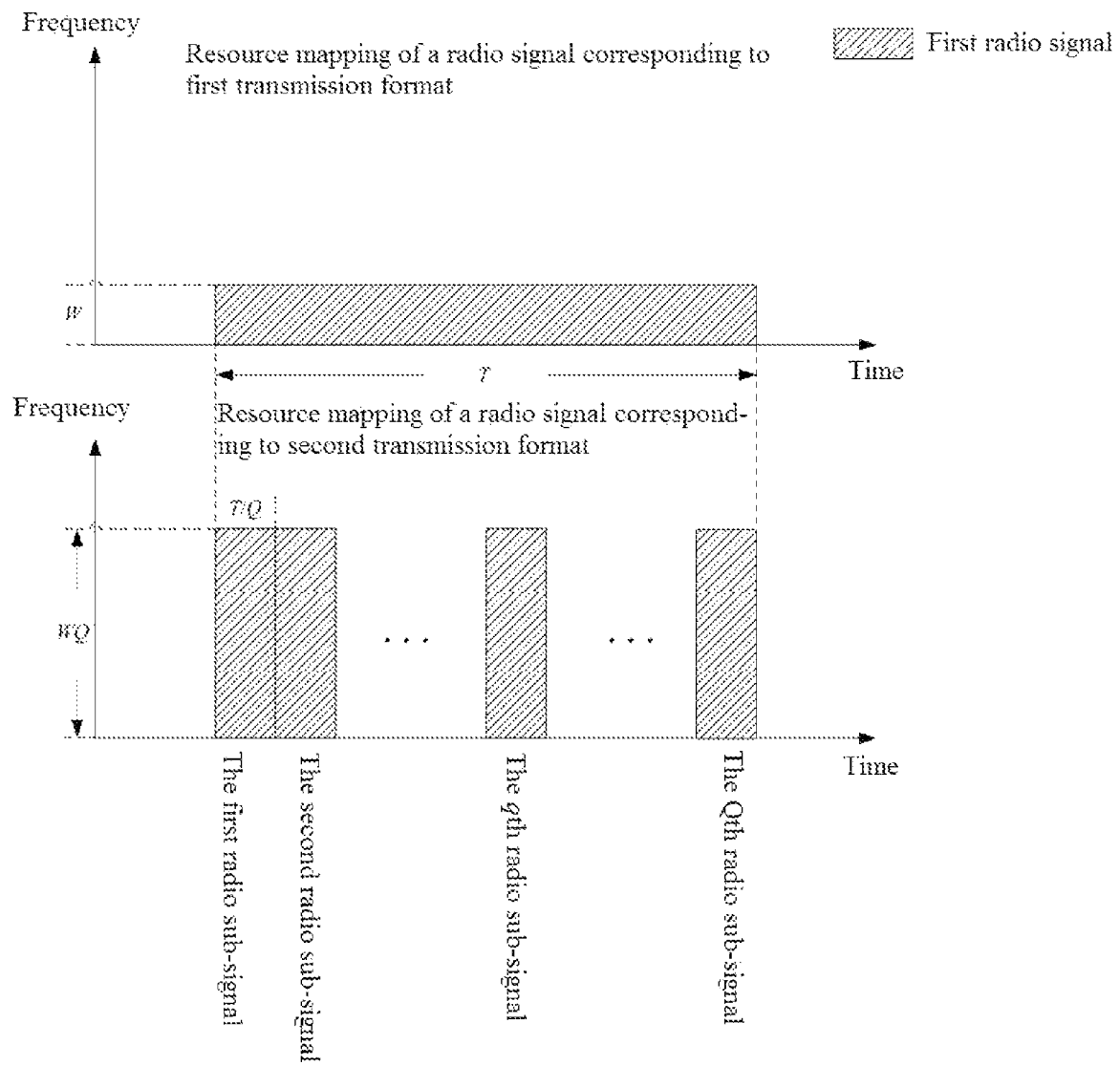
FIG. 6 is a diagram illustrating a resource mapping of a radio signal corresponding to a first transmission format and a resource mapping of a radio signal corresponding to a second transmission format according to one embodiment of the present disclosure.

Embodiment 6 illustrates an example of a diagram of a resource mapping of a radio signal corresponding to the first transmission format in the present disclosure and a resource mapping of a radio signal corresponding to the second transmission format in the present disclosure, as shown in FIG. 6.

In Embodiment 6, corresponding to the first transmission format, the first radio signal includes 1 radio sub-signal, that is, P=1. The radio sub-signal is transmitted by one antenna port group. Corresponding to the second transmission format, the first radio signal includes Q radio sub-signals, the Q radio sub-signals are transmitted by Q antenna port groups respectively, and the Q is an integer greater than 1.

In one embodiment, time domain resources occupied by the first radio signal are unrelated to the transmission format corresponding to the first radio signal. In one subembodiment, no matter in the case of the first transmission format or in the case of the second transmission format, the time domain resources occupied by the first radio signal are T time unit(s), wherein the T is a positive integer. In one subembodiment, the time unit is an Orthogonal Frequency Division Multiplexing (OFDM) symbol.

In one subembodiment, the T is an integer greater than or equal to Q. Time domain resources occupied by any of the Q radio sub-signals have a time duration of T/Q time unit(s), that is, the T1=T2= . . . =$T_Q$=T/Q, wherein $T_q$ is a time duration corresponding to time domain resources occupied by the qth (q=1–Q) radio sub-signal among the Q radio sub-signals.

In one embodiment, time domain resources occupied by any two of the Q radio sub-signals are orthogonal. In one subembodiment, time domain resources occupied by the Q radio sub-signals are consecutive.

In one embodiment, the first bit block corresponds to a first TTI; a physical layer channel to which a given radio sub-signal is mapped, in the case of the second transmission format, corresponds to a TTI which has a less time duration than the first TTI; and the given radio sub-signal is any of the Q radio sub-signals. In one subembodiment, the Q radio sub-signals include at least two radio sub-signals, and physical layer channels to which the two radio sub-signals are mapped, in the case of the second transmission format, correspond to TTIs of different time durations.

In one embodiment, in the case of the first transmission format, frequency domain resources occupied by the first radio signal in a frequency domain are W1 bandwidth units; in the case of the second transmission format, frequency domain resources occupied by any of the Q radio sub-signals in a frequency domain are W2 bandwidth units; the W2 is equal to W1 multiplied by Q, the W1 is a positive integer, and the W2 is a positive integer.

In one subembodiment, the bandwidth unit is the bandwidth of a subcarrier spacing.

In one subembodiment, in the case of the first transmission format, the frequency domain resources occupied by the first radio signal in the frequency domain are consecutive.

In one subembodiment, in the case of the first transmission format, the frequency domain resources occupied by the first radio signal in the frequency domain are inconsecutive.

In one subembodiment, in the case of the second transmission format, the frequency domain resources occupied by any of the Q radio sub-signals in the frequency domain are consecutive.

In one subembodiment, in the case of the second transmission format, the frequency domain resources occupied by any of the Q radio sub-signals in the frequency domain are inconsecutive.

In one subembodiment, in the case of the second transmission format, frequency domain resources occupied by any two of the Q radio sub-signals in the frequency domain are the same.

In one subembodiment, in the case of the second transmission format, frequency domain resources occupied by any two of the Q radio sub-signals in the frequency domain are different.

Embodiment 7

Figure 7:
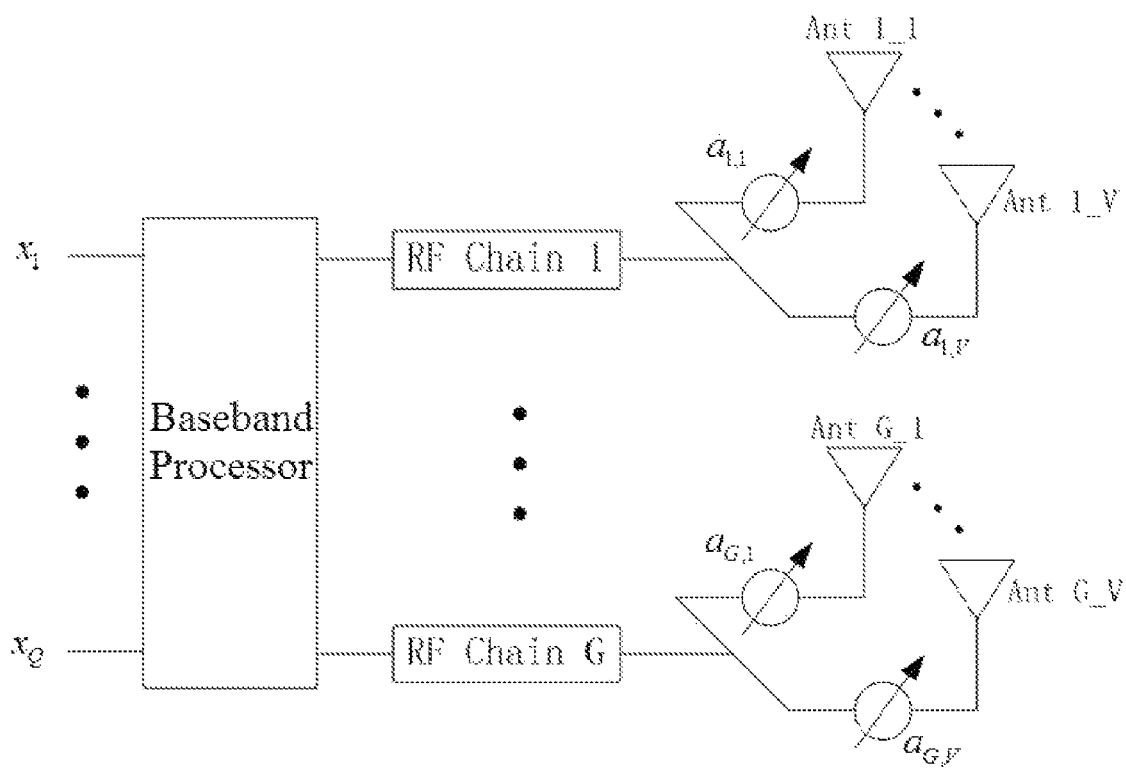
FIG. 7 is a diagram illustrating an antenna structure according to one embodiment of the present disclosure.

Embodiment 7 illustrates an example of a diagram of an antenna structure, as shown in FIG. 7. In FIG. 7, a communication node is equipped with G antenna group(s), and the G antenna groups correspond to G Radio Frequency (RF) Chain(s) respectively. One antenna group includes V antennas. The G is a positive integer, and the V is a positive integer. For 1≤g≤G, antennas in an antenna group #g include {Ant g_1, Ant g_2, . . . , Ant g_V} shown in FIG. 7, the antennas in the antenna group #g perform analog beamforming through an analog beamforming vector $c_g$, wherein $c_g$ is a V×1-dimensional vector. $x_1, \ldots, x_Q$ in FIG. 7 are desired signals to be transmitted, and the desired signals are transmitted after experiencing digital beamforming and analog beamforming. The baseband processor is used for performing digital beamforming for the $x_1 \ldots x_Q$, and the analog beamforming vector is used for performing analog beamforming for the output of the baseband processor. B is used to express a digital beamforming matrix, wherein B is a G×L-dimensional matrix. The lth (1≤l≤L) beamforming vector corresponding to the antenna group #g is a product of the gth element in the lth column ($b_l$) of the digital beamforming matrix B and an analog beamforming vector $c_g$ corresponding to the antenna group #g, that is, $b_{l,g}c_g$, wherein $b_{l,g}$ is the gth element in the lth column of the digital beamforming matrix B.

In one embodiment, the G antenna groups are mapped to Q antenna port groups. A number of antenna groups contained in the qth antenna port group is expressed by $G_q$. (An) index(es) of the antenna group(s) contained in the qth antenna port group is(are) identified by $\{j_{q,1}, \ldots, j_{q,G_q}\}$. A digital beamforming vector corresponding to the lth (1≤l≤L) antenna port in the qth (1≤q≤Q) antenna port group consists of elements $$\{b_{l,j_{q,1}}, \ldots, b_{l,j_{q,G_q}}\}$$

of the $b_l$, and is expressed as $b_{l,q} = [b_{l,j_{q,1}}, \ldots, b_{l,j_{q,G_q}}]^T$, wherein $b_{l,q}$ is the digital beamforming vector corresponding to the lth antenna port in the qth antenna port group, and the sign "T" means transpose.

In one subembodiment, different antenna groups contained in one same antenna port group use the same analog beamforming vector, that is, $c_{j_q,1}=c_{j_q,2}=\ldots=c_{j_qG_q}=c_q$. Antenna groups contained in different antenna port groups use different analog beamforming vectors, that is, if $1\leq q1\leq Q$, $1\leq q2\leq Q$, $q1\neq q2$, then, $c_{q1}\neq c_{q2}$. The complete beamforming vector $w_{l,q}$ of the lth antenna port in the qth antenna port group is formed by a product of a analog beamforming matrix $C_q$ corresponding to the qth antenna port group and the digital beamforming vector $b_{l,q}$ corresponding to the lth antenna port in the qth antenna port group, that is, $w_{l,q}=C_q b_{l,q}$, wherein the analog beamforming matrix $C_q$ is a $G_qV\times G_q$-dimensional matrix, the $C_q$ is formed by $G_q$ numbered $c_q$s that are in diagonal arrangement, that $$\text{is } C_q = \begin{bmatrix} c_q & \cdots & 0 \\ \vdots & \ddots & \vdots \\ 0 & \cdots & c_q \end{bmatrix}.$$

In one subembodiment, antenna groups in different antenna port groups use mutually orthogonal analog beamforming vectors.

In one subembodiment, different antenna ports in one antenna port group correspond to different digital beamforming vectors.

In one subembodiment, different antenna ports in one antenna port group correspond to mutually orthogonal digital beamforming vectors.

In one subembodiment, all antenna port groups include a same number of antenna groups.

In one subembodiment, at least two of the antenna port groups include different numbers of antenna groups.

Embodiment 8

Figure 8:
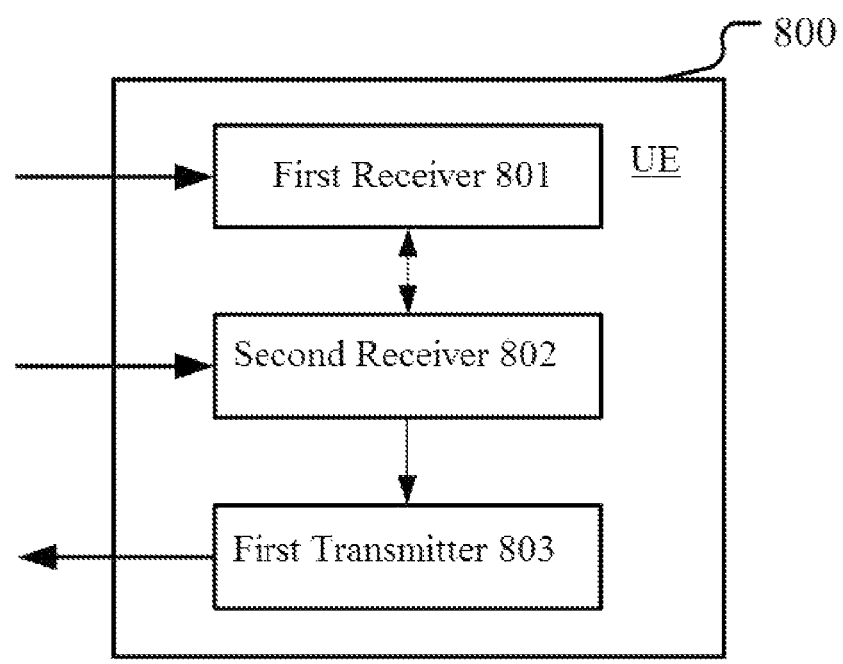
FIG. 8 is a structure block diagram illustrating a processing device in a UE according to one embodiment of the present disclosure.

Embodiment 8 is a structure block diagram of a processing device in a UE, as shown in FIG. 8. In FIG. 8, the processing device 800 in the UE is mainly composed of a first receiver 801, a second receiver 802 and a first transmitter 803.

The first receiver 801 receives a first signaling; the second receiver 802 receives a first radio signal, wherein the first radio signal carries a first bit block; and the first transmitter 803 transmits a third signaling, wherein the third signaling is used for indicating whether the first radio signal is correctly received.

In Embodiment 8, the first signaling is a physical layer signaling, the first signaling is used for determining a transmission format corresponding to the first radio signal, and the first bit block includes a positive integer number of bits. The transmission format corresponding to the first radio signal is one transmission format in a first format set, and the first format set includes a first transmission format and a second transmission format. A radio signal corresponding to the first transmission format includes P radio sub-signal(s), each of the P radio sub-signal(s) carries the first bit block, each of the P radio sub-signal(s) is transmitted by a same antenna port group, and the P is a positive integer. A radio signal corresponding to the second transmission format includes Q radio sub-signals, each of the Q radio sub-signals carries the first bit block, the Q radio sub-signals are transmitted by Q antenna port groups respectively, any two of the Q antenna port groups cannot be assumed to be same, and the Q is an integer greater than 1. The antenna port group includes one or more antenna ports.

In one embodiment, a time duration of time domain resources occupied by the first radio signal is unrelated to the transmission format corresponding to the first radio signal.

In one embodiment, the second receiver 802 further receives a second signaling; wherein the second signaling is a high-layer signaling, the second signaling is used for determining the first format set, the first format set is one of K candidate format sets, and the K is a positive integer greater than 1.

In one embodiment, the second receiver 802 further receives a second radio signal, the second radio signal carrying the first bit block; wherein a transmission format corresponding to the second radio signal is one transmission format in the first format set, and the transmission format corresponding to the second radio signal is different from the transmission format corresponding to the first radio signal.

In one embodiment, the first receiver 801 includes at least one of {the antenna 452, the receiver 454, the receiving processor 456, the multi-antenna receiving processor 458, the controller/processor 459, the memory 460, the data source 467} mentioned in Embodiment 4.

In one embodiment, the second receiver 802 includes at least one of {the antenna 452, the receiver 454, the receiving processor 456, the multi-antenna receiving processor 458, the controller/processor 459, the memory 460, the data source 467} mentioned in Embodiment 4.

In one embodiment, the first transmitter 803 includes at least one of {the antenna 452, the transmitter 454, the transmitting processor 468, the multi-antenna transmitting processor 457, the controller/processor 459, the memory 460, the data source 467} mentioned in Embodiment 4.

Embodiment 9

Figure 9:
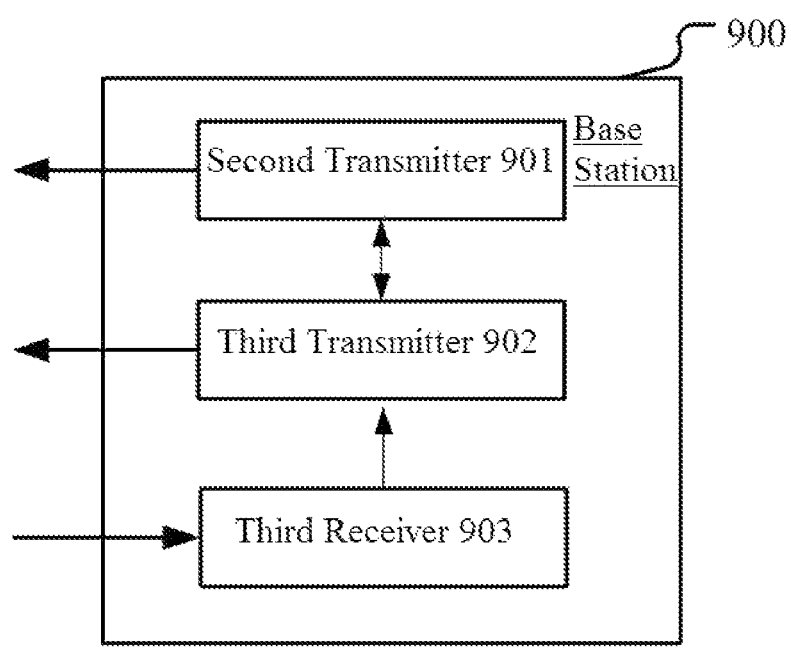
FIG. 9 is a structure block diagram illustrating a processing device in a base station according to one embodiment of the present disclosure.

Embodiment 9 is a structure block diagram of a processing device in a base station, as shown in FIG. 9. In FIG. 9, the processing device 900 is mainly composed of a second transmitter 901, a third transmitter 902 and a third receiver 903.

The second transmitter 901 transmits a first signaling; the third transmitter 902 transmits a first radio signal, wherein the first radio signal carries a first bit block; and the third receiver 903 receives a third signaling, wherein the third signaling is used for indicating whether the first radio signal is correctly received.

In Embodiment 9, the first signaling is a physical layer signaling, the first signaling is used for determining a transmission format corresponding to the first radio signal, and the first bit block includes a positive integer number of bits. The transmission format corresponding to the first radio signal is one transmission format in a first format set, and the first format set includes a first transmission format and a second transmission format. A radio signal corresponding to the first transmission format includes P radio sub-signal(s), each of the P radio sub-signal(s) carries the first bit block, each of the P radio sub-signal(s) is transmitted by a same antenna port group, and the P is a positive integer. A radio signal corresponding to the second transmission format includes Q radio sub-signals, each of the Q radio sub-signals carries the first bit block, the Q radio sub-signals are transmitted by Q antenna port groups respectively, any two of the Q antenna port groups cannot be assumed to be same, and the Q is an integer greater than 1. The antenna port group includes one or more antenna ports.

In one embodiment, a time duration of time domain resources occupied by the first radio signal is unrelated to the transmission format corresponding to the first radio signal.

In one embodiment, the third transmitter 902 further transmits a second signaling; wherein the second signaling is a high-layer signaling, the second signaling is used for determining the first format set, the first format set is one of K candidate format sets, and the K is a positive integer greater than 1.

In one embodiment, the third transmitter 902 further transmits a second radio signal, the second radio signal carrying the first bit block; wherein a transmission format corresponding to the second radio signal is one transmission format in the first format set, and the transmission format corresponding to the second radio signal is different from the transmission format corresponding to the first radio signal.

In one embodiment, the second transmitter 901 includes at least one of {the antenna 420, the transmitter 418, the transmitting processor 416, the multi-antenna transmitting processor 471, the controller/processor 475, the memory 476} mentioned in Embodiment 4.

In one embodiment, the third transmitter 902 includes at least one of {the antenna 420, the transmitter 418, the transmitting processor 416, the multi-antenna transmitting processor 471, the controller/processor 475, the memory 476} mentioned in Embodiment 4.

In one embodiment, the third receiver 903 includes at least one of {the antenna 420, the receiver 418, the receiving processor 470, the multi-antenna receiving processor 472, the controller/processor 475, the memory 476} mentioned in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure includes but not limited to mobile phones, tablet computers, notebooks, network cards, NB-IoT terminals, eMTC terminals, and other wireless communication equipment. The base station or system in the present disclosure includes but not limited to macro-cellular base stations, micro-cellular base stations, home base stations, relay base station, and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) in wireless transmission, comprising:
   receiving a first signaling;
   receiving a first radio signal, the first radio signal carrying a first bit block; and
   transmitting a third signaling;
   wherein the first signaling is a physical layer signaling, the first signaling is a Downlink control information (DCI), the first signaling includes scheduling information of the first radio signal, and the scheduling information includes at least one of occupied time-frequency resources, an Modulation and coding scheme (MCS), an Redundancy Version (RV), or a Hybrid Automatic Repeat request (HARQ) Process Number; the first signaling is used for determining a transmission format corresponding to the first radio signal, the first bit block is a Transport Block (TB), and the first bit block comprises a positive integer number of bits; the transmission format corresponding to the first radio signal is one transmission format in a first format set, and the first format set comprises a first transmission format and a second transmission format; a radio signal corresponding to the first transmission format comprises P radio sub-signal(s), each of the P radio sub-signal(s) carries the first bit block, each of the P radio sub-signal(s) is transmitted by a same antenna port group, and the P is a positive integer; the P is equal to 1, or, the P is greater than 1 and time domain resources occupied by any two of the P radio sub-signals are orthogonal; a radio signal corresponding to the second transmission format comprises Q radio sub-signals, each of the Q radio sub-signals carries the first bit block, the Q radio sub-signals are transmitted by Q antenna port groups respectively, any two of the Q antenna port groups cannot be assumed to be same, time domain resources occupied by any two of the Q radio sub-signals are orthogonal, and the Q is an integer greater than 1; and the antenna port group comprises one or more antenna ports; the third signaling is used for indicating whether the first radio signal is correctly received; and a physical layer channel corresponding to the first radio signal includes a PDSCH.

2. The method according to claim 1, comprising:
   receiving a second signaling; wherein the second signaling is a high-layer signaling, the second signaling is used for determining the first format set, the first format set is one of K candidate format sets, and the K is a positive integer greater than 1;
   or, receiving a second signaling; wherein the second signaling is a high-layer signaling, the second signaling is used for determining the first format set, the first format set is one of K candidate format sets, and the K is a positive integer greater than 1, each of the K candidate format sets includes the first transmission format;
   or, receiving a second signaling; wherein the second signaling is a high-layer signaling, the second signaling is used for determining the first format set, the first format set is one of K candidate format sets, and the K is a positive integer greater than 1, each of the K candidate format sets includes the first transmission format, the candidate format set consists of two transmission formats.

3. The method according to claim 1, wherein time domain resources occupied by the first radio signal are unrelated to the transmission format corresponding to the first radio signal;
   or, a time duration of time domain resources occupied by the first radio signal is unrelated to the transmission format corresponding to the first radio signal;
   or, no matter in the case of the first transmission format or in the case of the second transmission format, time domain resources occupied by the first radio signal are T Orthogonal Frequency Division Multiplexing (OFDM) symbols, wherein the T is an integer greater than or equal to Q; and time domain resources occupied by any of the Q radio sub-signals have a time duration of T/Q OFDM symbol(s).

4. The method according to claim 1, wherein a payload size of the first signaling is different for the first transmission format and the second transmission format;

or, a payload size of the first signaling is different for the first transmission format and the second transmission format; the UE determines the transmission format corresponding to the first radio signal according to the payload size of the first signaling;

or, a payload size of the first signaling is same for the first transmission format and the second transmission format, and the first signaling indicates explicitly the transmission format corresponding to the first radio signal.

5. The method according to claim 1, wherein the Q antenna port groups include a same number of antenna port(s);

or, the Q antenna port groups include a same number of antenna port(s), the first signaling is used for determining the number of antenna port(s) in the antenna port group;

or, different antenna ports in one same antenna port group transmit the first radio signal through closed-loop Spatial Multiplexing (SM).

6. A method in a base station in wireless transmission, comprising:

transmitting a first signaling;

transmitting a first radio signal, the first radio signal carrying a first bit block; and receiving a third signaling;

wherein the first signaling is a physical layer signaling, the first signaling is a Downlink control information (DCI), the first signaling includes scheduling information of the first radio signal, and the scheduling information includes at least one of occupied time-frequency resources, an Modulation and coding scheme (MCS), an Redundancy Version (RV), or a Hybrid Automatic Repeat request (HARQ) Process Number; the first signaling is used for determining a transmission format corresponding to the first radio signal, the first bit block is a Transport Block (TB), and the first bit block comprises a positive integer number of bits; the transmission format corresponding to the first radio signal is one transmission format in a first format set, and the first format set comprises a first transmission format and a second transmission format; a radio signal corresponding to the first transmission format comprises P radio sub-signal(s), each of the P radio sub-signal(s) carries the first bit block, each of the P radio sub-signal(s) is transmitted by a same antenna port group, and the P is a positive integer; the P is equal to 1, or, the P is greater than 1 and time domain resources occupied by any two of the P radio sub-signals are orthogonal; a radio signal corresponding to the second transmission format comprises Q radio sub-signals, each of the Q radio sub-signals carries the first bit block, the Q radio sub-signals are transmitted by Q antenna port groups respectively, any two of the Q antenna port groups cannot be assumed to be same, time domain resources occupied by any two of the Q radio sub-signals are orthogonal, and the Q is an integer greater than 1; and the antenna port group comprises one or more antenna ports; the third signaling is used for indicating whether the first radio signal is correctly received; and a physical layer channel corresponding to the first radio signal includes a PDSCH.

7. The method according to claim 6, comprising:

transmitting a second signaling; wherein the second signaling is a high-layer signaling, the second signaling is used for determining the first format set, the first format set is one of K candidate format sets, and the K is a positive integer greater than 1;

or, transmitting a second signaling; wherein the second signaling is a high-layer signaling, the second signaling is used for determining the first format set, the first format set is one of K candidate format sets, and the K is a positive integer greater than 1, each of the K candidate format sets includes the first transmission format;

or, transmitting a second signaling; wherein the second signaling is a high-layer signaling, the second signaling is used for determining the first format set, the first format set is one of K candidate format sets, and the K is a positive integer greater than 1, each of the K candidate format sets includes the first transmission format, the candidate format set consists of two transmission formats.

8. The method according to claim 6, wherein time domain resources occupied by the first radio signal are unrelated to the transmission format corresponding to the first radio signal;

or, a time duration of time domain resources occupied by the first radio signal is unrelated to the transmission format corresponding to the first radio signal;

or, no matter in the case of the first transmission format or in the case of the second transmission format, time domain resources occupied by the first radio signal are T Orthogonal Frequency Division Multiplexing (OFDM) symbols, wherein the T is an integer greater than or equal to Q; and time domain resources occupied by any of the Q radio sub-signals have a time duration of T/Q OFDM symbol(s).

9. The method according to claim 6, wherein a payload size of the first signaling is different for the first transmission format and the second transmission format;

or, a payload size of the first signaling is different for the first transmission format and the second transmission format; a target receiver of the first radio signal determines the transmission format corresponding to the first radio signal according to the payload size of the first signaling;

or, a payload size of the first signaling is same for the first transmission format and the second transmission format, and the first signaling indicates explicitly the transmission format corresponding to the first radio signal.

10. The method according to claim 6, wherein the Q antenna port groups include a same number of antenna port(s);

or, the Q antenna port groups include a same number of antenna port(s), the first signaling is used for determining the number of antenna port(s) in the antenna port group;

or, different antenna ports in one same antenna port group transmit the first radio signal through closed-loop Spatial Multiplexing (SM).

11. A UE in wireless transmission, comprising:

a first receiver, to receive a first signaling;

a second receiver, to receive a first radio signal, the first radio signal carrying a first bit block; and a first transmitter, to transmit a third signaling;

wherein the first signaling is a physical layer signaling, the first signaling is a Downlink control information (DCI), the first signaling includes scheduling information of the first radio signal, and the scheduling information includes at least one of occupied time-frequency resources, an Modulation and coding scheme (MCS), an Redundancy Version (RV), or a Hybrid Automatic Repeat request (HARQ) Process Number; the first signaling is used for determining a transmission format corresponding to the first radio signal, the first bit block is a Transport Block (TB), and the first bit block comprises a positive integer number of bits; the transmission format corresponding to the first radio signal is one transmission format in a first format set, and the first format set comprises a first transmission format and a second transmission format; a radio signal corresponding to the first transmission format comprises P radio sub-signal(s), each of the P radio sub-signal(s) carries the first bit block, each of the P radio sub-signal(s) is transmitted by a same antenna port group, and the P is a positive integer; the P is equal to 1, or, the P is greater than 1 and time domain resources occupied by any two of the P radio sub-signals are orthogonal; a radio signal corresponding to the second transmission format comprises Q radio sub-signals, each of the Q radio sub-signals carries the first bit block, the Q radio sub-signals are transmitted by Q antenna port groups respectively, any two of the Q antenna port groups cannot be assumed to be same, time domain resources occupied by any two of the Q radio sub-signals are orthogonal, and the Q is an integer greater than 1; and the antenna port group comprises one or more antenna ports; the third signaling is used for indicating whether the first radio signal is correctly received; and a physical layer channel corresponding to the first radio signal includes a PDSCH.

12. The UE according to claim 11, wherein a payload size of the first signaling is different for the first transmission format and the second transmission format;
or, a payload size of the first signaling is different for the first transmission format and the second transmission format; the UE determines the transmission format corresponding to the first radio signal according to the payload size of the first signaling;
or, a payload size of the first signaling is same for the first transmission format and the second transmission format, and the first signaling indicates explicitly the transmission format corresponding to the first radio signal.

13. The UE according to claim 11, wherein the second receiver further receives a second signaling; wherein the second signaling is a high-layer signaling, the second signaling is used for determining the first format set, the first format set is one of K candidate format sets, and the K is a positive integer greater than 1;
or, the second receiver further receives a second signaling; wherein the second signaling is a high-layer signaling, the second signaling is used for determining the first format set, the first format set is one of K candidate format sets, and the K is a positive integer greater than 1, each of the K candidate format sets includes the first transmission format;
or, the second receiver further receives a second signaling; wherein the second signaling is a high-layer signaling, the second signaling is used for determining the first format set, the first format set is one of K candidate format sets, and the K is a positive integer greater than 1, each of the K candidate format sets includes the first transmission format, the candidate format set consists of two transmission formats.

14. The UE according to claim 11, wherein time domain resources occupied by the first radio signal are unrelated to the transmission format corresponding to the first radio signal;
or, a time duration of time domain resources occupied by the first radio signal is unrelated to the transmission format corresponding to the first radio signal;
or, no matter in the case of the first transmission format or in the case of the second transmission format, time domain resources occupied by the first radio signal are T Orthogonal Frequency Division Multiplexing (OFDM) symbols, wherein the T is an integer greater than or equal to Q; and time domain resources occupied by any of the Q radio sub-signals have a time duration of T/Q OFDM symbol(s).

15. The UE according to claim 11, wherein the Q antenna port groups include a same number of antenna port(s);
or, the Q antenna port groups include a same number of antenna port(s), the first signaling is used for determining the number of antenna port(s) in the antenna port group;
or, different antenna ports in one same antenna port group transmit the first radio signal through closed-loop Spatial Multiplexing (SM).

16. A base station in wireless transmission, comprising:
a second transmitter, to transmit a first signaling;
a third transmitter, to transmit a first radio signal, the first radio signal carrying a first bit block; and
a third receiver, to receive a third signaling;
wherein the first signaling is a physical layer signaling, the first signaling is a Downlink control information (DCI), the first signaling includes scheduling information of the first radio signal, and the scheduling information includes at least one of occupied time-frequency resources, an Modulation and coding scheme (MCS), an Redundancy Version (RV), or a Hybrid Automatic Repeat request (HARQ) Process Number; the first signaling is used for determining a transmission format corresponding to the first radio signal, the first bit block is a Transport Block (TB), and the first bit block comprises a positive integer number of bits; the transmission format corresponding to the first radio signal is one transmission format in a first format set, and the first format set comprises a first transmission format and a second transmission format; a radio signal corresponding to the first transmission format comprises P radio sub-signal(s), each of the P radio sub-signal(s) carries the first bit block, each of the P radio sub-signal(s) is transmitted by a same antenna port group, and the P is a positive integer; the P is equal to 1, or, the P is greater than 1 and time domain resources occupied by any two of the P radio sub-signals are orthogonal; a radio signal corresponding to the second transmission format comprises Q radio sub-signals, each of the Q radio sub-signals carries the first bit block, the Q radio sub-signals are transmitted by Q antenna port groups respectively, any two of the Q antenna port groups cannot be assumed to be same, time domain resources occupied by any two of the Q radio sub-signals are orthogonal, and the Q is an integer greater than 1; and the antenna port group comprises one or more antenna ports; the third signaling is used for indicating whether the first radio signal is correctly received; and a physical layer channel corresponding to the first radio signal includes a PDSCH.

17. The base station according to claim 16, wherein a payload size of the first signaling is different for the first transmission format and the second transmission format;
   or, a payload size of the first signaling is different for the first transmission format and the second transmission format; a target receiver of the first radio signal determines the transmission format corresponding to the first radio signal according to the payload size of the first signaling;
   or, a payload size of the first signaling is same for the first transmission format and the second transmission format, and the first signaling indicates explicitly the transmission format corresponding to the first radio signal.

18. The base station according to claim 16, wherein the third transmitter further transmits a second signaling; wherein the second signaling is a high-layer signaling, the second signaling is used for determining the first format set, the first format set is one of K candidate format sets, and the K is a positive integer greater than 1;
   or, the third transmitter further transmits a second signaling; wherein the second signaling is a high-layer signaling, the second signaling is used for determining the first format set, the first format set is one of K candidate format sets, and the K is a positive integer greater than 1, each of the K candidate format sets includes the first transmission format;
   or, the third transmitter further transmits a second signaling; wherein the second signaling is a high-layer signaling, the second signaling is used for determining the first format set, the first format set is one of K candidate format sets, and the K is a positive integer greater than 1, each of the K candidate format sets includes the first transmission format, the candidate format set consists of two transmission formats.

19. The base station according to claim 16, wherein time domain resources occupied by the first radio signal are unrelated to the transmission format corresponding to the first radio signal;
   or, a time duration of time domain resources occupied by the first radio signal is unrelated to the transmission format corresponding to the first radio signal;
   or, no matter in the case of the first transmission format or in the case of the second transmission format, time domain resources occupied by the first radio signal are T Orthogonal Frequency Division Multiplexing (OFDM) symbols, wherein the T is an integer greater than or equal to Q; and time domain resources occupied by any of the Q radio sub-signals have a time duration of T/Q OFDM symbol(s).

20. The base station according to claim 16, wherein the Q antenna port groups include a same number of antenna port(s);
   or, the Q antenna port groups include a same number of antenna port(s), the first signaling is used for determining the number of antenna port(s) in the antenna port group;
   or, different antenna ports in one same antenna port group transmit the first radio signal through closed-loop Spatial Multiplexing (SM).

* * * * *